US009921665B2

(12) United States Patent
Scott et al.

(10) Patent No.: US 9,921,665 B2
(45) Date of Patent: Mar. 20, 2018

(54) INPUT METHOD EDITOR APPLICATION PLATFORM

(75) Inventors: Matthew Robert Scott, Beijing (CN); Huihua Hou, Beijing (CN); Xi Chen, Tianjin (CN); Weipeng Liu, Beijing (CN); Rongfeng Lai, Beijing (CN); Xi Chen, Beijing (CN); Yonghong Shi, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/586,267

(22) Filed: Aug. 15, 2012

(65) Prior Publication Data

US 2013/0346872 A1 Dec. 26, 2013

Related U.S. Application Data

(63) Continuation of application No. PCT/CN2012/077436, filed on Jun. 25, 2012.

(51) Int. Cl.
*G06F 15/177* (2006.01)
*G06F 3/023* (2006.01)
(Continued)

(52) U.S. Cl.
CPC ........ *G06F 3/0237* (2013.01); *G06F 3/04842* (2013.01); *G06F 17/24* (2013.01);
(Continued)

(58) Field of Classification Search
CPC .......... G06F 3/04842; G06F 17/30554; G06F 17/24; G06F 17/276; G06F 17/273;
(Continued)

(56) References Cited

U.S. PATENT DOCUMENTS 4,559,604 A 12/1985 Ichikawa et al.
5,303,150 A 4/1994 Kameda
(Continued)

FOREIGN PATENT DOCUMENTS

CN 1609764 4/2005
CN 1851617 10/2006
(Continued)

OTHER PUBLICATIONS

Guo, Hai, and Jing-ying Zhao. "NaXi Pictographs Input Method and WEFT." Journal of Computers 5.1 (2010): 117-124.*
(Continued)

*Primary Examiner* — Hien Duong
(74) *Attorney, Agent, or Firm* — Drinker Biddle & Reath LLP

(57) ABSTRACT

An input method editor (IME) provides a distributed platform architecture that enables associating multiple applications with the IME to provide extended functionalities. The presentations of the applications, such as skins, may be different from each other and that of the IME. The applications may be represented in a manifest file that is human-readable and editable. The IME collects multiple parameters relating to a user input into a host application including a query input by the user and a scenario of the host application, and selects one or more applications to provide candidates based on a score or ranking of the applications under the collected multiple parameters. Machine-learning may be used to improve the score or ranking. The candidates may include text candidates, rich candidates, and informative candidates.

20 Claims, 13 Drawing Sheets

(51) Int. Cl.

| | | |
|---|---|---|
| *G06F 17/27* | (2006.01) | |
| *H04L 12/58* | (2006.01) | |
| *G06F 17/24* | (2006.01) | |
| *G06Q 50/00* | (2012.01) | |
| *G06F 17/30* | (2006.01) | |
| *G06Q 10/10* | (2012.01) | |
| *G06F 3/0484* | (2013.01) | |

(52) U.S. Cl.
CPC .......... *G06F 17/273* (2013.01); *G06F 17/276* (2013.01); *G06F 17/2735* (2013.01); *G06F 17/3056* (2013.01); *G06F 17/3064* (2013.01); *G06F 17/3087* (2013.01); *G06F 17/30241* (2013.01); *G06F 17/30554* (2013.01); *G06Q 10/10* (2013.01); *G06Q 50/01* (2013.01); *H04L 51/10* (2013.01); *H04L 51/32* (2013.01)

(58) Field of Classification Search
CPC .......... G06F 17/2735; G06F 17/30241; G06F 17/3056; G06F 17/3087; G06Q 50/01; G06Q 10/10; H04L 51/10; H04L 51/32; H04N 21/4788
See application file for complete search history.

(56) References Cited

U.S. PATENT DOCUMENTS

| | | |
|---|---|---|
| 5,386,556 A | 1/1995 | Hedin et al. |
| 5,485,372 A | 1/1996 | Golding et al. |
| 5,655,129 A | 8/1997 | Ito |
| 5,734,749 A | 3/1998 | Yamada et al. |
| 5,778,361 A | 7/1998 | Nanjo et al. |
| 5,787,422 A | 7/1998 | Tukey et al. |
| 5,796,866 A | 8/1998 | Sakurai et al. |
| 5,832,478 A | 11/1998 | George |
| 5,873,107 A | 2/1999 | Borovoy et al. |
| 5,896,321 A | 4/1999 | Miller et al. |
| 5,926,652 A | 7/1999 | Reznak |
| 5,963,671 A | 10/1999 | Comerford et al. |
| 5,987,415 A | 11/1999 | Breese et al. |
| 5,995,928 A | 11/1999 | Nguyen et al. |
| 6,014,638 A | 1/2000 | Burge et al. |
| 6,076,056 A | 6/2000 | Huang et al. |
| 6,085,160 A | 7/2000 | D'hoore et al. |
| 6,092,044 A | 7/2000 | Baker et al. |
| 6,141,655 A | 10/2000 | Johnson et al. |
| 6,236,964 B1 | 5/2001 | Tamura et al. |
| 6,247,043 B1 | 6/2001 | Bates et al. |
| 6,339,776 B2 | 1/2002 | Dayani-Fard et al. |
| 6,363,342 B2 | 3/2002 | Shaw et al. |
| 6,377,965 B1 | 4/2002 | Hachamovitch et al. |
| 6,408,266 B1 | 6/2002 | Oon |
| 6,424,358 B1 | 7/2002 | DiDomizio et al. |
| 6,460,015 B1 | 10/2002 | Hetherington et al. |
| 6,490,563 B2 | 12/2002 | Hon et al. |
| 6,519,599 B1 | 2/2003 | Chickering et al. |
| 6,556,990 B1 | 4/2003 | Lane |
| 6,564,213 B1 | 5/2003 | Ortega et al. |
| 6,573,844 B1 | 6/2003 | Venolia et al. |
| 6,654,733 B1 | 11/2003 | Goodman et al. |
| 6,658,404 B1 | 12/2003 | Cecchini |
| 6,687,734 B1 | 2/2004 | Sellink et al. |
| 6,731,307 B1 | 5/2004 | Strubbe et al. |
| 6,732,074 B1 | 5/2004 | Kuroda |
| 6,785,677 B1 | 8/2004 | Fritchman |
| 6,801,190 B1 | 10/2004 | Robinson et al. |
| 6,801,661 B1 | 10/2004 | Sotak et al. |
| 6,801,893 B1 | 10/2004 | Backfried et al. |
| 6,934,767 B1 | 8/2005 | Jellinek |
| 6,941,267 B2 | 9/2005 | Matsumoto |
| 6,963,841 B2 | 11/2005 | Handal et al. |
| 7,069,254 B2 | 6/2006 | Foulger et al. |
| 7,089,266 B2 | 8/2006 | Stolte et al. |
| 7,089,504 B1 | 8/2006 | Froloff |
| 7,099,876 B1 | 8/2006 | Hetherington et al. |
| 7,107,204 B1 | 9/2006 | Liu et al. |
| 7,133,876 B2 | 11/2006 | Roussopoulos et al. |
| 7,165,032 B2 | 1/2007 | Bellegarda |
| 7,171,353 B2 | 1/2007 | Trower, II et al. |
| 7,181,450 B2 | 2/2007 | Malloy et al. |
| 7,194,538 B1 | 3/2007 | Rabe et al. |
| 7,224,346 B2 | 5/2007 | Sheng |
| 7,225,200 B2 | 5/2007 | Chickering et al. |
| 7,236,923 B1 | 6/2007 | Gupta |
| 7,277,029 B2 | 10/2007 | Thiesson et al. |
| 7,308,439 B2 | 12/2007 | Baird et al. |
| 7,349,981 B2 | 3/2008 | Guerrero |
| 7,353,247 B2 | 4/2008 | Hough et al. |
| 7,360,151 B1 | 4/2008 | Froloff |
| 7,370,275 B2 * | 5/2008 | Haluptzok ............ G06F 9/4443 704/231 |
| 7,383,299 B1 | 6/2008 | Hailpern et al. |
| 7,389,223 B2 | 6/2008 | Atkin et al. |
| 7,395,203 B2 | 7/2008 | Wu et al. |
| 7,447,627 B2 | 11/2008 | Jessee et al. |
| 7,451,152 B2 | 11/2008 | Kraft et al. |
| 7,490,033 B2 | 2/2009 | Chen et al. |
| 7,505,954 B2 | 3/2009 | Heidloff et al. |
| 7,505,985 B2 | 3/2009 | Kilroy |
| 7,512,904 B2 | 3/2009 | Matthews et al. |
| 7,539,656 B2 | 5/2009 | Fratkina et al. |
| 7,555,713 B2 | 6/2009 | Yang |
| 7,562,082 B2 | 7/2009 | Zhou |
| 7,565,157 B1 | 7/2009 | Ortega et al. |
| 7,599,915 B2 | 10/2009 | Hill et al. |
| 7,617,205 B2 | 11/2009 | Bailey et al. |
| 7,676,517 B2 | 3/2010 | Hurst-Hiller et al. |
| 7,689,412 B2 | 3/2010 | Wu et al. |
| 7,725,318 B2 | 5/2010 | Gavalda et al. |
| 7,728,735 B2 | 6/2010 | Aaron et al. |
| 7,752,034 B2 | 7/2010 | Brockett et al. |
| 7,769,804 B2 | 8/2010 | Church et al. |
| 7,844,599 B2 | 11/2010 | Kasperski et al. |
| 7,881,934 B2 | 2/2011 | Endo et al. |
| 7,917,355 B2 | 3/2011 | Wu et al. |
| 7,917,488 B2 | 3/2011 | Niu et al. |
| 7,930,676 B1 | 4/2011 | Thomas |
| 7,953,730 B1 | 5/2011 | Bleckner et al. |
| 7,957,955 B2 | 6/2011 | Christie et al. |
| 7,957,969 B2 | 6/2011 | Alewine et al. |
| 7,983,910 B2 | 7/2011 | Subramanian et al. |
| 8,161,073 B2 | 4/2012 | Connor |
| 8,230,336 B2 | 7/2012 | Morrill |
| 8,285,745 B2 | 10/2012 | Li et al. |
| 8,498,864 B1 | 7/2013 | Liang et al. |
| 8,539,359 B2 | 9/2013 | Rapaport et al. |
| 8,564,684 B2 | 10/2013 | Bai |
| 8,597,031 B2 | 12/2013 | Cohen et al. |
| 8,762,356 B1 | 6/2014 | Kogan |
| 8,996,356 B1 | 3/2015 | Yang et al. |
| 9,489,458 B1 * | 11/2016 | Haugen ............ G06F 17/30864 |
| 2001/0048753 A1 | 12/2001 | Lee et al. |
| 2002/0005784 A1 | 1/2002 | Balkin et al. |
| 2002/0045463 A1 | 4/2002 | Chen et al. |
| 2002/0099536 A1 | 7/2002 | Bordner et al. |
| 2002/0099581 A1 | 7/2002 | Chu et al. |
| 2002/0103809 A1 | 8/2002 | Starzl et al. |
| 2002/0116528 A1 | 8/2002 | Vale |
| 2002/0123994 A1 | 9/2002 | Schabes et al. |
| 2002/0138479 A1 | 9/2002 | Bates et al. |
| 2002/0156779 A1 | 10/2002 | Elliott et al. |
| 2002/0188603 A1 | 12/2002 | Baird et al. |
| 2003/0041147 A1 | 2/2003 | van den Oord et al. |
| 2003/0061027 A1 | 3/2003 | Weise et al. |
| 2003/0160830 A1 | 8/2003 | DeGross |
| 2003/0179229 A1 | 9/2003 | Van Erlach et al. |
| 2003/0212702 A1 | 11/2003 | Campos et al. |
| 2003/0220917 A1 | 11/2003 | Copperman et al. |
| 2004/0128122 A1 | 7/2004 | Privault et al. |
| 2004/0201607 A1 | 10/2004 | Mulvey et al. |
| 2004/0210844 A1 * | 10/2004 | Pettinati ............ G06Q 10/10 715/708 |
| 2004/0220925 A1 | 11/2004 | Liu et al. |

(56) References Cited

U.S. PATENT DOCUMENTS

| | | |
|---|---|---|
| 2004/0243415 A1 | 12/2004 | Commarford et al. |
| 2004/0260534 A1 | 12/2004 | Pak et al. |
| 2004/0267737 A1 | 12/2004 | Takazawa et al. |
| 2005/0050095 A1 | 3/2005 | Hurtis et al. |
| 2005/0102131 A1 | 5/2005 | Trower et al. |
| 2005/0144064 A1 | 6/2005 | Calabria et al. |
| 2005/0144162 A1 | 6/2005 | Liang |
| 2005/0203738 A1 | 9/2005 | Hwang |
| 2005/0216253 A1 | 9/2005 | Brockett |
| 2005/0283468 A1 | 12/2005 | Kamvar et al. |
| 2006/0026147 A1 | 2/2006 | Cone et al. |
| 2006/0047701 A1 | 3/2006 | Maybury et al. |
| 2006/0085392 A1 | 4/2006 | Wang et al. |
| 2006/0123338 A1 | 6/2006 | McCaffrey et al. |
| 2006/0146028 A1* | 7/2006 | Chang ............... G06F 3/018 345/169 |
| 2006/0163337 A1 | 7/2006 | Unruh |
| 2006/0167857 A1 | 7/2006 | Kraft et al. |
| 2006/0190822 A1 | 8/2006 | Basson et al. |
| 2006/0204142 A1 | 9/2006 | West et al. |
| 2006/0206324 A1 | 9/2006 | Skilling et al. |
| 2006/0206454 A1 | 9/2006 | Forstall et al. |
| 2006/0242608 A1* | 10/2006 | Garside ............... G06F 17/211 715/864 |
| 2006/0248074 A1 | 11/2006 | Carmel et al. |
| 2006/0290535 A1 | 12/2006 | Thiesson et al. |
| 2007/0011154 A1 | 1/2007 | Musgrove et al. |
| 2007/0016422 A1 | 1/2007 | Mori et al. |
| 2007/0033269 A1 | 2/2007 | Atkinson et al. |
| 2007/0050339 A1 | 3/2007 | Kasperski et al. |
| 2007/0052868 A1 | 3/2007 | Chou et al. |
| 2007/0088686 A1 | 4/2007 | Hurst-Hiller et al. |
| 2007/0089125 A1 | 4/2007 | Claassen |
| 2007/0124132 A1 | 5/2007 | Takeuchi |
| 2007/0136256 A1 | 6/2007 | Kapur et al. |
| 2007/0143262 A1 | 6/2007 | Kasperski |
| 2007/0147269 A1 | 6/2007 | Ettle et al. |
| 2007/0150279 A1 | 6/2007 | Gandhi et al. |
| 2007/0162281 A1 | 7/2007 | Saitoh et al. |
| 2007/0164782 A1 | 7/2007 | Church et al. |
| 2007/0167689 A1 | 7/2007 | Ramadas et al. |
| 2007/0168469 A1 | 7/2007 | Church et al. |
| 2007/0185859 A1 | 8/2007 | Flowers et al. |
| 2007/0192710 A1 | 8/2007 | Platz et al. |
| 2007/0208738 A1 | 9/2007 | Morgan |
| 2007/0213983 A1 | 9/2007 | Ramsey |
| 2007/0214164 A1 | 9/2007 | MacLennan et al. |
| 2007/0233651 A1 | 10/2007 | Deshpande et al. |
| 2007/0233692 A1 | 10/2007 | Lisa et al. |
| 2007/0255552 A1 | 11/2007 | Thiesson et al. |
| 2007/0255567 A1 | 11/2007 | Bangalore et al. |
| 2007/0282811 A1 | 12/2007 | Musgrove |
| 2008/0046405 A1 | 2/2008 | Olds et al. |
| 2008/0052152 A1 | 2/2008 | Yufik |
| 2008/0071740 A1 | 3/2008 | Jhala et al. |
| 2008/0104101 A1 | 5/2008 | Kirshenbaum et al. |
| 2008/0115046 A1* | 5/2008 | Yamaguchi ............ G06F 17/214 715/201 |
| 2008/0133752 A1 | 6/2008 | Liekens et al. |
| 2008/0140519 A1 | 6/2008 | Thiesson et al. |
| 2008/0158201 A1 | 7/2008 | Yoshida |
| 2008/0167858 A1 | 7/2008 | Christie et al. |
| 2008/0171555 A1 | 7/2008 | Oh et al. |
| 2008/0189628 A1 | 8/2008 | Liesche et al. |
| 2008/0195645 A1 | 8/2008 | Lapstun et al. |
| 2008/0195980 A1 | 8/2008 | Morris |
| 2008/0201326 A1 | 8/2008 | Cotter et al. |
| 2008/0208567 A1 | 8/2008 | Brockett et al. |
| 2008/0221893 A1 | 9/2008 | Kaiser |
| 2008/0288474 A1 | 11/2008 | Chin et al. |
| 2008/0294982 A1 | 11/2008 | Leung et al. |
| 2008/0312910 A1 | 12/2008 | Zhang |
| 2009/0002178 A1 | 1/2009 | Guday et al. |
| 2009/0043584 A1 | 2/2009 | Philips |
| 2009/0043741 A1 | 2/2009 | Kim |
| 2009/0055386 A1 | 2/2009 | Boss et al. |
| 2009/0063404 A1 | 3/2009 | Hacigumus et al. |
| 2009/0077464 A1 | 3/2009 | Goldsmith et al. |
| 2009/0106224 A1 | 4/2009 | Roulland et al. |
| 2009/0128567 A1 | 5/2009 | Shuster et al. |
| 2009/0154795 A1 | 6/2009 | Tan et al. |
| 2009/0187515 A1 | 7/2009 | Andrew et al. |
| 2009/0187824 A1* | 7/2009 | Hinckley ............ G06F 3/04883 715/711 |
| 2009/0210214 A1 | 8/2009 | Qian et al. |
| 2009/0216690 A1* | 8/2009 | Badger ................. G06F 3/0237 706/11 |
| 2009/0222437 A1 | 9/2009 | Niu et al. |
| 2009/0249198 A1 | 10/2009 | Davis et al. |
| 2009/0300546 A1* | 12/2009 | Kwok .................. G06Q 10/107 715/825 |
| 2009/0313239 A1 | 12/2009 | Wen et al. |
| 2010/0005086 A1* | 1/2010 | Wang ..................... G06F 3/018 707/E17.014 |
| 2010/0100369 A1 | 4/2010 | Shetty et al. |
| 2010/0122155 A1 | 5/2010 | Monsarrat |
| 2010/0125811 A1 | 5/2010 | Moore et al. |
| 2010/0138210 A1 | 6/2010 | Seo et al. |
| 2010/0146407 A1 | 6/2010 | Bokor et al. |
| 2010/0169770 A1 | 7/2010 | Hong et al. |
| 2010/0180199 A1 | 7/2010 | Wu et al. |
| 2010/0217581 A1 | 8/2010 | Hong |
| 2010/0217795 A1 | 8/2010 | Hong |
| 2010/0222056 A1 | 9/2010 | Wu |
| 2010/0231523 A1 | 9/2010 | Chou |
| 2010/0245251 A1 | 9/2010 | Yuan et al. |
| 2010/0251304 A1 | 9/2010 | Donoghue et al. |
| 2010/0306139 A1 | 12/2010 | Wu et al. |
| 2010/0306248 A1 | 12/2010 | Bao et al. |
| 2010/0309137 A1 | 12/2010 | Lee |
| 2011/0014952 A1 | 1/2011 | Minton |
| 2011/0022621 A1 | 1/2011 | Luo et al. |
| 2011/0041077 A1 | 2/2011 | Reiner |
| 2011/0060761 A1 | 3/2011 | Fouts |
| 2011/0066431 A1 | 3/2011 | Ju et al. |
| 2011/0087483 A1 | 4/2011 | Hsieh et al. |
| 2011/0107265 A1 | 5/2011 | Buchanan et al. |
| 2011/0131642 A1 | 6/2011 | Hamura et al. |
| 2011/0137635 A1 | 6/2011 | Chalabi et al. |
| 2011/0145234 A1* | 6/2011 | Hu ..................... G06F 17/30867 707/728 |
| 2011/0161080 A1 | 6/2011 | Ballinger et al. |
| 2011/0161311 A1 | 6/2011 | Mishne et al. |
| 2011/0173172 A1 | 7/2011 | Hong et al. |
| 2011/0178981 A1 | 7/2011 | Bowen et al. |
| 2011/0184723 A1 | 7/2011 | Huang et al. |
| 2011/0188756 A1 | 8/2011 | Lee et al. |
| 2011/0191321 A1 | 8/2011 | Gade et al. |
| 2011/0201387 A1 | 8/2011 | Paek et al. |
| 2011/0202836 A1 | 8/2011 | Badger et al. |
| 2011/0202876 A1 | 8/2011 | Badger et al. |
| 2011/0219299 A1 | 9/2011 | Scalosub |
| 2011/0258535 A1 | 10/2011 | Adler, III et al. |
| 2011/0282903 A1 | 11/2011 | Zhang |
| 2011/0289105 A1 | 11/2011 | Hershowitz |
| 2011/0296324 A1 | 12/2011 | Goossens et al. |
| 2012/0005184 A1 | 1/2012 | Thilagar et al. |
| 2012/0016678 A1 | 1/2012 | Gruber et al. |
| 2012/0019446 A1 | 1/2012 | Wu et al. |
| 2012/0022853 A1* | 1/2012 | Ballinger ............... G10L 15/30 704/8 |
| 2012/0023103 A1 | 1/2012 | Soderberg et al. |
| 2012/0029902 A1 | 2/2012 | Lu et al. |
| 2012/0035932 A1 | 2/2012 | Jitkoff et al. |
| 2012/0036468 A1 | 2/2012 | Colley |
| 2012/0041752 A1* | 2/2012 | Wang .................... G06F 3/018 704/2 |
| 2012/0060113 A1 | 3/2012 | Sejnoha et al. |
| 2012/0060147 A1* | 3/2012 | Hong .................. G06F 17/2223 717/113 |
| 2012/0078611 A1 | 3/2012 | Soltani et al. |
| 2012/0113011 A1 | 5/2012 | Wu et al. |
| 2012/0117506 A1 | 5/2012 | Koch et al. |

(56) References Cited

U.S. PATENT DOCUMENTS

| | | | |
|---|---|---|---|
| 2012/0131032 A1* | 5/2012 | Rakshit | G06F 17/30873 707/767 |
| 2012/0143897 A1 | 6/2012 | Wei et al. | |
| 2012/0173222 A1 | 7/2012 | Wang et al. | |
| 2012/0222056 A1 | 8/2012 | Donoghue et al. | |
| 2012/0297294 A1 | 11/2012 | Scott et al. | |
| 2012/0297332 A1 | 11/2012 | Changuion et al. | |
| 2012/0311480 A1* | 12/2012 | Cohen | G06F 3/0237 715/780 |
| 2013/0016113 A1 | 1/2013 | Adhikari et al. | |
| 2013/0054617 A1 | 2/2013 | Colman | |
| 2013/0091409 A1 | 4/2013 | Jeffery | |
| 2013/0132359 A1 | 5/2013 | Lee et al. | |
| 2013/0159920 A1 | 6/2013 | Scott et al. | |
| 2013/0298030 A1 | 11/2013 | Nahumi et al. | |
| 2013/0346872 A1 | 12/2013 | Scott et al. | |
| 2014/0040238 A1 | 2/2014 | Scott et al. | |
| 2015/0081369 A1* | 3/2015 | Sarrazin | G06Q 10/109 705/7.18 |
| 2015/0088927 A1* | 3/2015 | Sarrazin | G06Q 10/109 707/769 |
| 2015/0106702 A1 | 4/2015 | Scott et al. | |
| 2015/0121291 A1 | 4/2015 | Scott et al. | |
| 2015/0127748 A1 | 5/2015 | Buryak | |
| 2015/0161126 A1 | 6/2015 | Wang et al. | |
| 2015/0370833 A1 | 12/2015 | Fey et al. | |
| 2016/0196150 A1 | 7/2016 | Jing et al. | |

FOREIGN PATENT DOCUMENTS

| | | |
|---|---|---|
| CN | 1851617 A | 10/2006 |
| CN | 1908863 | 2/2007 |
| CN | 101183355 | 5/2008 |
| CN | 101276245 | 10/2008 |
| CN | 101286092 | 10/2008 |
| CN | 101286093 | 10/2008 |
| CN | 101286094 | 10/2008 |
| CN | 101587471 | 11/2009 |
| CN | 101661474 | 3/2010 |
| CN | 102012748 | 4/2011 |
| CN | 102056335 | 5/2011 |
| CN | 102144228 | 8/2011 |
| CN | 102193643 | 9/2011 |
| CN | 102314441 | 1/2012 |
| CN | 102314461 | 1/2012 |
| EP | 924594 A2 | 6/1999 |
| JP | 9204445 A | 8/1997 |
| JP | 11345247 A | 12/1999 |
| JP | 2000148748 | 5/2000 |
| JP | 2002506256 A | 2/2002 |
| JP | 2004504674 A | 2/2004 |
| JP | 2006107502 A | 4/2006 |
| JP | 2008505407 A | 2/2008 |
| JP | 2011507099 | 3/2011 |
| JP | 2012008874 | 1/2012 |
| JP | 2012094156 | 5/2012 |
| WO | 182119 A2 | 11/2001 |
| WO | WO2010105440 | 9/2010 |
| WO | WO2010105440 A1 | 9/2010 |

OTHER PUBLICATIONS

Office Action for U.S. Appl. No. 13/109,021, mailed on Mar. 11, 2014, Dyer, A.R., "Network Search for Writing Assistance," 18 pages.

Office action for U.S. Appl. No. 13/315,047, mailed on Apr. 24, 2014, Liu et al., "Sentiment Aware User Interface Customization", 13 pages.

Office action for U.S. Appl. No. 12/693,316, mailed on May 19, 2014, Huang et al., "Phonetic Suggestion Engine", 22 pages.

Office Action for U.S. Appl. No. 13/109,021, mailed on Jun. 19, 2014, Dyer, A.R., "Network Search for Writing Assistance," 42 pages.

"Prose", Dictionary.com, Jun. 19, 2014, 2 pgs.

Damper, "Self-Learning and Connectionist Approaches to Text-Phoneme Conversion", retrieved on May 26, 2010 at <<ftp://ftp.cogsci.ed.ac.uk/pub/joe/newbull.ps>>, UCL Press, Connectionist Models of Memory and Language, 1995, pp. 117-144.

"Database", Microsoft Computer Dictionary, Fifth Edition, retrieved on May 13, 2011, at <<http://academic.safaribooksonline.com/book/communications/0735614954>>, Microsoft Press, May 1, 2002, 2 pages.

"File", Microsoft Computer Dictionary, Fifth Edition, retrieved on May 13, 2011, at <<http://academic.safaribooksonline.com/book/communications/0735614954>>, Microsoft Press, May 1, 2002, 2 pages.

Final Office Action for U.S. Appl. No. 13/109,021, mailed on Jan. 11, 2013, Scott et al., "Network Search for Writing Assistance", 16 pages.

Office action for U.S. Appl. No. 12/693,316, mailed on Oct. 30, 2013, Huang, et al., "Phonetic Suggestion Engine", 24 pages.

Office action for U.S. Appl. No. 12/693,316, mailed on Jun. 19, 2013, Huang et al., "Phonetic Suggestion Engine", 20 pages.

Office Action for U.S. Appl. No. 13/109,021, mailed on Aug. 21, 2012, Scott et al., "Network Search for Writing Assistance", 19 pages.

Office Action for U.S. Appl. No. 13/109,021, mailed on Sep. 25, 2013, Scott et al., "Network Search for Writing Assistance", 18 pages.

Wikipedia, "Soundex", retrieved on Jan. 20, 2010 at http://en.wikipedia.org/wiki/soundex, 3 pgs.

Ciccolini, "Baidu IME More Literate in Chinese Input," Published Sep. 15, 2011, <<http://www.itnews-blog.com/it/81630.html>>, 4 pages.

Scott et al., "Engkoo: Mining theWeb for Language Learning," In Proceedings of the 49th Annual Meeting of the Association for Computational Linguistics: Human Language Technologies: Systems Demonstrations, Jun. 21, 2011, 6 pages.

Sowmya et al., "Transliteration Based Text Input Methods for Telugu," <<http://content.imamu.edu.sa/Scholars/it/VisualBasic/2009_53.pdf>>, Proceedings of 22nd International Conference on Computer Processing of Oriental Languages. Language Technology for the Knowledge-based Economy (ICCPOL), Mar. 2009, pp. 122-132.

U.S. Appl. No. 12/960,258, filed Dec. 3, 2010, Wei, et al., "Wild Card Auto Completion," 74 pages.

U.S. Appl. No. 13/109,021, filed May 17, 2011, Matthew Robert Scott, "Network Search for Writing Assistance," 43 pages.

U.S. Appl. No. 13/331,023, filed Dec. 20, 2011,Tony Hou, Weipeng Liu, Weijiang Xu, and Xi Chen, "Scenario-Adaptive Input Method Editor," 57 pages.

Ramiro, "Baidu IME More literate in Chinese input," Published Sep. 15, 2011, retrieved at <<http://www.itnews-blog.com/it/81630.html>>, 4 pages.

Millward, "Baidu Japan Acquires Simeji Mobile App Team, for added Japanese Typing fun," Published Dec. 13, 2011, 3 pages.

Gamon et al., "Using Statistical Techniques and Web Search to Correct ESL Errors," Published 2009, retrieved from <<http://research.microsoft.com/pubs/81312/Calico_published.pdf>>, CALICO Journal, vol. 26, No. 3, 2009, 21 pages.

"Google launched Input Method editor—type anywhere in your language," published Mar. 2, 2010, retrieved at <<http://shoutingwords.com/google-launched-input-method-editor.html>>, 12 pages.

Lenssen, "Google Releases Pinyin Converter," Published Apr. 4, 2007, retrieved at <<http://blogoscoped.com/archive/2007-04-04-n49.html>>, 3 pages.

"Google Scribe," retrieved at <<http://www.scribe.googlelabs.com/>>, retrieved date: Feb. 3, 2011, 1 page.

Google Transliteration Input Method (IME) Configuration, published Feb. 5, 2010, retrieved at <<http://www.technicstoday.com/2010/02/google-transliteration-input-method-ime-configuration/>>, pp. 1-13.

Komasu et al., "Corpus-based Predictive Text Input," Proceedings of the Third International Conference on Active Media Technology, May 2005, 6 pages.

(56) References Cited

OTHER PUBLICATIONS

Lo et al., "Cross platform CJK input Method Engine," IEEE International Conference on Systems, Man and Cybernetics, Oct. 6, 2002, retrieved at <<http://ieeexplore.ieee.org/stamp/stamp.jsp?tp=&arnumber=1175680>>, pp. 1-6.
"Microsoft Research ESL Assistant," retrieved at <<http://www.eslassistant.com/>>, retrieved date: Feb. 3, 2011, 1 page.
Mohan et al., "Input Method Configuration Overview," Jun. 3, 2011, retrieved at <<http://gameware.autodesk.com/documents/gfx_4.0_ime.pdf>>, 71 pages.
Suematsu et al., "Network-Based Context-Aware Input Method Editor," Proceedings: Sixth International Conference on Networking and Services (ICNS), Mar. 7, 2010, retrieved at <<http://ieeexplore.ieee.org/stamp/stamp.jsp?tp=&arnumber=5460679>>, pp. 1-6.
Suzuki et al., "A Comparative Study on Language Model Adaptation Techniques using New Evaluation Metrics," Proceedings: HLT/EMNLP, Vancouver, Oct. 6-8, 2005, retrieved at <<http://www.aclweb.org/anthology/H/H05/H05-1034.pdf>>, 8 pages.
Windows XP Chinese Pinyin Setup, published Apr. 15, 2006, retrieved at <<http://www.pinyinjoe.com/pinyin/pinyin_setup.htm>>, pp. 1-10.
"Google Scribe," retrieved at http://www.scribe.googlelabs.com/, retrieved date: Feb. 3, 2011, 1 page.
Wikipedia, "Selection Based Search", retrieved Mar. 23, 2012 at http://en.wikipedia.org/wiki/Selection based search, 3 pgs.
"Microsoft Research ESL Assistant," retrieved at <<http://www.eslassistant.com/>>, retrieved date Feb. 3, 2011, 1 page.
Millward, "Baidu Japan Acquires Simeji Mobile App Team, for added Japanese Typing Fun", May 23, 2012, 3 pages.
"Search Engine", Microsoft Computer Dictionary, Mar. 2002, Fifth Edition, pp. 589.
Office action for U.S. Appl. No. 13/567,305, mailed on Jan. 30, 2014, Scott, et al., "Business Intelligent In-Document Suggestions", 14 pages.
Office action for U.S. Appl. No. 13/315,047, mailed on Feb. 12, 2014, Liu, et al., "Sentiment Aware User Interface Customization", 14 pages.
International Search Report & Written Opinion for PCT Patent Application No. PCT/US2013/053321, Mailed Date: Oct. 1, 2013, Filed Date: Aug. 2, 2013, 9 Pages.
Office action for U.S. Appl. No. 12/693,316, mailed on Oct. 16, 2014, Huang et al., "Phonetic Suggestion Engine," 24 pages.
Office Action for U.S. Appl. No. 13/315,047, mailed on Oct. 2, 2014, Weipeng Liu, "Sentiment Aware User Interface Customization," 12 pages.
Office action for U.S. Appl. No. 13/331,023, mailed on Feb. 12, 2015, Scott et al, "Scenario-Adaptive Input Method Editor," 20 pages.
Office action for U.S. Appl. No. 13/635,219, mailed on Mar. 13, 2015, Scott et al., "Cross-Lingual Input Method Editor," 21 pages.
Office action for U.S. Appl. No. 13/635,306, mailed on Mar. 27, 2015, Scott et al., "Input Method Editor," 18 pages.
Non-Final Office Action for U.S. Appl. No. 13/331,023, mailed Aug. 4, 2014, Matthew Robert Scott et al., "Scenario-Adaptive Input Method Editor," 20 pages.
The European Office Action mailed Oct. 8, 2015 for European patent application No. 12879804.8, a counterpart foreign application of U.S. Appl. No. 13/586,267, 9 pages.
The Supplemenary European Search Report mailed Jul. 16, 2015 for European patent application No. 12880149.5, 5 pages.
The Supplemenary European Search Report mailed Sep. 14, 2015 for European patent application No. 12879804.8, 5 pages.
Miessler, "7 Essential Firefox Quicksearches", Retrieved from <<https:danielmiessler.com/blog/7-essential-firefox-quicksearches/>>, Published Aug. 19, 2007, 2 pages.
Office action for U.S. Appl. No. 13/635,306, mailed on Aug. 14, 2015, Scott et al., "Input Method Editor", 26 pages.
Office action for U.S. Appl. No. 13/315,047, mailed on Sep. 24, 2015, Liu et al., "Sentiment Aware User Interface Customization", 12 pages.
Office action for U.S. Appl. No. 13/635,219, mailed on Sep. 29, 2015, Scott et al., "Cross-Lingual Input Method Editor", 14 page.
U.S. Appl. No. 13/635,219, filed Sep. 14, 2011, Scott, et al., "Cross-Lingual Input Method Editor" 43 pages.
Engkoo Pinyin Redefines Chinese Input, Published on: May 13, 2013, Retrieved from: http://research.microsoft.com/en-us/news/features/engkoopinyinime-051313.aspx; 3 pages.
"English Assistant", Published on: Apr. 19, 2013, Retrieved from: http://bing.msn.cn/pinyin/; 2 pages.
"Innovative Chinese Engine", Published on: May 2, 2013, Retrieved from: http://bing.msn.cn/pinyin/help.shtml; 6 pages.
"Input Method (IME)", Retrieved on: Jul. 3, 2013, Retrieved from: http://www.google.co.in/inputtools/cloud/features/input-method.html; 6 pages.
International Search Report & Written Opinion for PCT Patent Application No. PCT/CN2013/081156, mailed May 5, 2014; filed Aug. 9, 2013, 14 pages.
Office action for U.S. Appl. No. 13/315,047, mailed on Apr. 28, 2015, Liu et al., "Sentiment Aware User Interface Customization", 12 pages.
Office action for U.S. Appl. No. 12/693,316, mailed on Oct. 16, 2014, Huang, et al., "Phonetic Suggestion Engine", 24 pages.
Office Action for U.S. Appl. No. 13/315,047, mailed on Oct. 2, 2014, Weipeng Liu, "Sentiment Aware User Interface Customization", 12 pages.
Office action for U.S. Appl. No. 13/331,023, mailed on Feb. 12, 2015, Scott et al, "Scenario-Adaptive Input Method Editor", 20 pages.
Office action for U.S. Appl. No. 13/635,219, mailed on Mar. 13, 2015, Scott et al., "Cross-Lingual Input Method Editor", 21 pages.
Office action for U.S. Appl. No. 13/635,306, mailed on Mar. 27, 2015, Scott et al., "Input Method Editor", 18 pages.
Non-Final Office Action for U.S. Appl. No. 13/331,023, mailed Aug. 4, 2014, Matthew Robert Scott et al., "Scenario-Adaptive Input Method Editor", 20 pages.
Dinamik-Bot, et al., "Input method", retrieved on May 6, 2015 at <<http://en.wikipedia.org/w/index.php?title=Input_method&oldid=496631911>>, Wikipedia, the free encyclopedia, Jun. 8, 2012, 4 pages.
The European Office Action mailed Jun. 18, 2015 for European patent application No. 12879676.0, a counterpart foreign application of U.S. Appl. No. 13/635,306, 5 pages.
The Supplementary European Search Report mailed May 20, 2015 for European Patent Application No. 12879676.0, 3 pages.
Office action for U.S. Appl. No. 13/701,008, mailed on May 12, 2015, Wang et al., "Feature-Based Candidate Selection", 12 pages.
Office action for U.S. Appl. No. 13/701,008, mailed on Jun. 15, 2015, Wang et al., "Feature-Based Candidate Selection", 17 pages.
Office action for U.S. Appl. No. 13/331,023, mailed on Jun. 26, 2015, Scott et al., "Scenario-Adaptive Input Method Editor", 23 pages.
Office Action for U.S. Appl. No. 13/109,021, mailed on Sep. 30, 2014, Dyer, A.R., "Network Search for Writing Assistance," 17 pages.
PCT International Preliminary Report on Patentability mailed Mar. 12, 2015 for PCT Application No. PCT/CN2012/080749, 8 pages.
Office action for U.S. Appl. No. 13/701,008, mailed on Mar. 17, 2016, Wang et al., "Feature-Based Candidate Selection," 13 pages.
The European Office Action mailed Mar. 1, 2016 for European Patent Application No. 12883902.4, a counterpart foreign application of U.S. Appl. No. 13/701,008, 8 pages.
Ben-Haim et al., "Improving Web-based Image Search via Content Based Clustering," Proceedings of the 2006 Conference on Computer Vision and Pattern Recognition Workshop (CVPRW '06), IEEE, Jun. 17, 2006, 6 pages.
Berg et al., "Animals on the Web," Proceedings of the 2006 IEEE Computer Society Conference on Computer Vision and Pattern Recognition (CVPR '06), vol. 2, IEEE, Jun. 17, 2006, pp. 1463-1470.

(56) References Cited

OTHER PUBLICATIONS

The European Office Action mailed Nov. 27, 2015 for European patent application No. 12880149.5, a counterpart foreign application of U.S. Appl. No. 13/635,219, 10 pages.
The Partial Supplemenary European Search Report mailed Oct. 26, 2015 for European patent application No. 12883902.4, 7 pages.
The Supplementary European Search Report mailed Nov. 12, 2015 for European patent application No. 12880149.5, 7 pages.
The European Search Report mailed Feb. 18, 2016 for European patent application No. 12883902.4, 7 pages.
Office action for U.S. Appl. No. 13/331,023 mailed on Nov. 20, 2015, Scott et al., "Scenario-Adaptive Input Method Editor," 25 pages.
PCT International Preliminary Report on Patentability mailed Feb. 18, 2016 for PCT Application No. PCT/CN2013/081156, 8 pages.
Ben-Haim, et al., "Improving Web-based Image Search via Content Based Clustering", Proceedings of the 2006 Conference on Computer Vision and Pattern Recognition Workshop (CVPRW '06), IEEE, Jun. 17, 2006, 6 pages.
Berg, et al., "Animals on the Web", Proceedings of the 2006 IEEE Computer Society Conference on Computer Vision and Pattern Recognition (CVPR '06), vol. 2, IEEE, Jun. 17, 2006, pp. 1463-1470.
Office action for U.S. Appl. No. 13/331,023 mailed on Nov. 11, 2015, Scott et al., "Scenario-Adaptive Input Method Editor," 25 pages.
Office action for U.S. Appl. No. 13/635,219, mailed on Mar. 24, 2016, Scott et al., "Cross-Lingual Input Method Editor," 29 pages.
The Japanese Office Action mailed Oct. 31, 2016 for Japanese Patent Application No. 2015-528828, a counterpart foreign application of U.S. Appl. No. 13/701,008.
Office action for U.S. Appl. No. 13/635,219, mailed on Nov. 14, 2016, Scott et al., "Cross-Lingual Input Method Editor", 27 pages.
The Chinese Office Action mailed Jun. 28, 2016 for Chinese Patent Application No. 201280074281.4, a counterpart foreign application of U.S. Appl. No. 13/586,267, 25 pages.
Translated Chinese Office Action mailed Jun. 3, 2016 for Chinese Patent Application No. 201280074382.1, a counterpart foreign application of U.S. Appl. No. 13/635,219, 18 pages.
The European Office Action mailed Jul. 19, 2016 for European Patent Application No. 13891201.9, a counterpart foreign application of U.S. Appl. No. 14/911,247, 7 pages.
The European Office Action mailed Jul. 19, 2016 for European patent application No. 12880149.5, a counterpart foreign application of U.S. Appl. No. 13/635,219, 7 pages.
The Supplementary European Search Report mailed Jul. 6, 2016 for European patent application No. 13891201.9, 4 pages.
Translated Japanese Office Action mailed May 24, 2016 for Japanese patent application No. 2015-528828, a counterpart foreign application of U.S. Appl. No. 13/701,008, 17 pages.
Office action for U.S. Appl. No. 13/635,306, mailed on Jul. 28, 2016, Scott et al., "Input Method Editor", 24 pages.
Final Office Action for U.S. Appl. No. 13/635,219, mailed on Aug. 10, 2016, Matthew Robert Scott, "Cross-Lingual Input Method Editor", 29 pages.
The Chinese Office Action dated Jan. 3, 2017 for Chinese patent application No. 201280074383.6, a counterpart foreign application of U.S. Appl. No. 13/635,306, 21 pages.
The Chinese Office Action dated Feb. 3, 2017 for Chinese patent application No. 201280074382.1, a counterpart foreign application of U.S. Appl. No. 13/635,219, 12 pages.
The European Office Action dated Dec. 22, 2016 for European patent application No. 12880149.5, a counterpart foreign application of U.S. Appl. No. 13/635,219, 11 pages.
Office action for U.S. Appl. No. 13/635,219, dated Nov. 14, 2016, Scott et al., "Cross-Lingual Input Method Editor", 27 pages.
Office action for U.S. Appl. No. 13/701,008, dated Nov. 30, 2016, Wang et al., "Feature-Based Candidate Selection", 21 pages.
Office action for U.S. Appl. No. 13/635,306, dated Feb. 25, 2016, Scott et al., "Input Method Editor", 29 pages.
The Chinese Office Action dated Mar. 24, 2017 for Chinese Patent Application No. 201280074281.4, a counterpart foreign application of U.S. Appl. No. 13/586,267, 28 pages.
Office action for U.S. Appl. No. 13/635,306, dated Feb. 25, 2017, Scott et al., "Input Method Editor", 23 pages.
The Chinese Office Action dated Jun. 19, 2017 for Chinese Patent Application No. 201280075557.0, a counterpart foreign application of U.S. Appl. No. 13/701,008, 13 pages.
"Advanced Querying and Information Retrieval", In Database System Concepts, 4th Edition, Retrieved Date: Nov. 14, 2007, 78 Pages.
"Merriam-Webster Collegiate Dictionary", In Merriam-Webster, 2000, 3 Pages.
"Microsoft Computer Dictionary, Fifth Edition", Microsoft Press, 2002, 3 Pages.
"Microsoft play mobile search 'wild card'", Retrieved From: <<https://www.themauritius.com/redirect/index.php?url=http://www.pcw.co.uk/vnunet/news/2155193/microsoft-plays-wild-card>>, May 3, 2006, 3 Pages.
"MSN Desktop Search (beta)", Retrieved From: <<http://www.pcmag.com/article2/0,1759,1771841,00.asp>>, Mar. 2, 2005, 2 Pages.
"Prose", Retrieved From <<https://web.archive.org/web/20070202094243/http://dictionary.reference.com/browse/Prose>>, Feb. 2, 2007, 3 Pages.
"Using the Word Wheel", Retrieved From: <<http://www.isys-search.com/support/techtips/wprdwheel.html>>, Retrieved From: Jun. 23, 2005, 1 Page.
"Weighted Finite-State Transducers in Speech Recognition", In Proceedings of the Computer Speech & Language, vol. 16, Issue 1, 2002, 27 Pages.
"Search Report Issued in European Patent Application No. 07754994.7", dated Feb. 15, 2012, 9 Pages.
"Office Action Issued in Korean Patent Application No. 10-2008-7026116", dated Feb. 20, 2013, 4 Pages.
"Non-Final Office Action Issued in U.S. Appl. No. 11/332,954", dated Mar. 1, 2012, 16 Pages.
"Notice of Allowance Issued in U.S. Appl. No. 12/693,316", dated Apr. 20, 2015, 10 Pages.
"Final Office Action Issued in U.S. Appl. No. 12/960,258", dated Nov. 2, 2012, 13 Pages.
"Final Office Action Issued in U.S. Appl. No. 12/960,258", dated Jan. 25, 2013, 16 Pages.
"Non-Final Office Action Issued in U.S. Appl. No. 12/960,258", dated Jul. 5, 2013, 14 Pages.
"Non-Final Office Action Issued in U.S. Appl. No. 12/960,258", dated Jun. 15, 2012, 11 Pages.
"Notice of Allowance Issued in U.S. Appl. No. 12/960,258", dated Nov. 21, 2013, 15 Pages.
"Notice of Allowance Issued in U.S. Appl. No. 13/315,047", dated Feb. 12, 2016, 15 Pages.
"Final Office Action Issued in U.S. Appl. No. 13/567,305", dated Jun. 13, 2014, 7 Pages.
"Notice of Allowance Issued in U.S. Appl. No. 13/567,305", dated Oct. 3, 2014, 8 Pages.
"Notice of Allowance Issued in U.S. Appl. No. 13/567,305", dated Nov. 6, 2014, 2 Pages.
"Notice of Allowance Issued in U.S. Appl. No. 13/567,305", dated Jan. 12, 2015, 2 Pages.
"Office Action Issued in Chinese Patent Application No. 200780003211.9", dated Jan. 29, 2012, 5 Pages.
"Office Action Issued in Chinese Patent Application No. 200780015952.9", dated Apr. 23, 2012, 6 Pages.
"Second Office Action Issued in Chinese Patent Application No. 200780015952.9", dated Aug. 17, 2011, dated Aug. 17, 2011, 8 Pages.
"Office Action Issued in Japanese Patent Application No. 2009-509573", dated Jun. 22, 2012, 8 Pages.
"Office Action Issued in Korean Patent Application No. 9-5-2013-024628057", dated Apr. 11, 2013, 7 Pages.
Barman, et al., "Parsimonious Explanations of Change in Hierarchical Data", In the Proceedings of the IEEE 23rd International Conference on Data Engineering, Apr. 2007, pp. 1273-1275.

(56) References Cited

OTHER PUBLICATIONS

Bentley, Jon Louis. "Multidimensional binary search trees used for associative searching", In Proceedings of the Communications of the ACM, vol. 18, Issue 9, Sep. 1975, pp. 509-517.

Blei, et al., "Hierarchical Bayesian Models for Applications in Information Retrieval", In Proceedings of the Seventh Valencia International Meeting. Oxford University Press, Bayesian Statistics, vol. 7, 2003, pp. 25-43.

Church, et al., "The Wild Thing!", In Proceedings of the ACL on Interactive Poster and demonstration sessions. Association for Computational Linguistics, Jun. 2005, pp. 93-96.

Ding, et al., "Computing Geographical Scopes of Web Resources", In Proceedings of the 26th VLDB Conference, 2000, 23 Pages.

Dumais, et al., "Stuff I've seen: A System for Personal Information Retrieval and Re-use", In Proceedings of the 26th annual international ACM SIGIR conference on Research and Development in Informaion Retrieval, Jul. 28, 2003, pp. 12-79.

Jelinek, Frederick "Statistical Methods for Speech Recognition", In Massachusetts Institute of Technology, 1997, 5 Pages.

McLlroy, M D. "Development of a Spelling List", In Proceedings of the IEEE Transactions on Communications vol. 30, Issue 1, 1982, 14 Pages.

Monaci, et al., "Image Compression with Learnt Tree-Structured Dictionaries", In Proceedings of the IEEE 6th Workshop on Multimedia Signal Processing, 2004, pp. 35-38.

"International Search Report and Written Opinion Issued in PCT Application No. PCT/US2007/008570", dated Sep. 28, 2007, 7 Pages.

Suematsu, et al., "Network Based Context Aware Input Method Editor", In Proceedings of the Sixth International conference on Networking and Services, Mar. 7, 2010, 6 Pages.

Vester, et al., "Information Retrieval in Document Spaces Using Clustering", In Master's Thesis, Department of Informatics and Mathematical Modeling, Technical University of Denmark, Aug. 2005, 266 Pages.

Yang, et al., "Detecting Dominant Locations from Search Queries", In Proceedings of the 28th Annual International ACM SIGIR conference on Research and development in information retrieval, Aug. 15-19, 2005, 8 Pages.

Witten, et al., "Managing Gigabytes Compressing and Indexing Document and Images", In Morgan Kaufmann Publishing, 1999, 65 Pages.

Witten, et al., "Managing Gigabytes: Compressing and Indexing Documents and Images(102-166)", In Morgan Kaufmann Publishing, 1999, 65 Pages.

Witten, et al., "Managing Gigabytes: Compressing and Indexing Documents and Images(167-221)", In Morgan Kaufmann Publishing, 1999, 55 Pages.

Witten, et al., "Managing Gigabytes: Compressing and Indexing Documents and Images(271-328)", In Morgan Kaufmann Publishing, 1999, 58 Pages.

Witten, et al., "Managing Gigabytes: Compressing and Indexing Documents and Images(222-270)", In Morgan Kaufmann Publishing, 1999, 48 Pages.

Witten, et al., "Managing Gigabytes: Compressing and Indexing Documents and Images(329-388)", In Morgan Kaufmann Publishing, 1999, 60 Pages.

Witten, et al., "Managing Gigabytes: Compressing and Indexing Documents and Images(37-101)", In Morgan Kaufmann Publishing, 1999, 65 Pages.

Witten, et al., "Managing Gigabytes: Compressing and Indexing Documents and Images(389-452)", In Morgan Kaufmann Publishing, 1999, 65 Pages.

Witten, et al., "Managing Gigabytes: Compressing and Indexing Documents and Images(453 backcover)", In Morgan Kaufmann Publishing, 1999, 67 Pages.

Zhou, et al., "A New Wildcard Search Method for Digital Dictonary Based on Mobile Platfom", In Proceedings of the 16th IEEE International Conference on Artificial Reality and Telexistence—Workshops, 2006, 5 Pages.

"Office Action Issued in Chinese Patent Application No. 201280074281.4", dated Oct. 25, 2017, 25 Pages.

\* cited by examiner

INPUT METHOD EDITOR APPLICATION PLATFORM

RELATED APPLICATION

This application is a continuation of PCT International Application No. PCT/CN2012/077436, filed Jun. 25, 2012, which is incorporated herein by reference.

BACKGROUND

A conventional input method editor (IME) is a computer application that assists a user to input text at a computing device. An IME may provide several input candidates based on a received input from the user. The input and the provided text candidates may be the same language or different languages.

For example, the user may input one or more initial English characters of a word or phrase and an IME, based on the initial characters, provides one or more complete words or phrases for the user to select a proper one. For another example, an IME may also assist the user to input non-Latin characters such as Chinese. The user may input Latin characters through a keyboard. The Latin characters may be a spelling of the Chinese characters. The IME returns one or more Chinese characters based on the spelling to the user to select a proper one. As the current keyboard usually only supports inputting Latin characters, the IME is useful for the user to input non-Latin characters.

The input candidate selected by the user can be inserted into various other computer applications, such as a chatting application, a document editing application, a gaming application, etc.

Typically, the conventional IME only provides input candidates in the form of text, and a single source is typically used to identify the input candidates, regardless of the type of application with which the IME is being used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

An input method editor (IME) as described herein provides candidates from which a user may select one or more to input into a host application at least partly based on one or more parameters. The one or more parameters, for example, may include a query input by the user into the IME, a scenario of the host application, a context of the user input, and/or a language mode. The provided candidates may include not only text candidates but also rich candidates and informative candidates. The user may select one or more of the text candidates and rich candidates as the user input. The one or more informative candidates are available to the user to illustrate or provide information associated with another candidate.

In addition, one or more applications may be associated with the IME to provide extended functionality to the IME, such as providing additional candidates. The one or more applications may be regarded as extensions of the IME. Some applications may have components residing at a local device and a remote server and are capable to call components at the server or other web services to provide the candidates. The user may select the one or more applications from an application store. Alternatively, one or more applications may be pre-installed or embedded within the IME. The IME may select one or more applications from the associated multiple applications to provide candidates at least partly based on the one or more parameters. In addition, the user may directly select and launch one or more applications from the IME to provide candidates.

For example, the IME may calculate a score or ranking of the applications based on the parameters and select one or more applications with rankings or scores higher than a threshold. Machine learning techniques may be used to adjust some attributes including scores or rankings for a particular application. The user may also modify the attributes of the particular application based on his/her preference.

Multiple applications may run concurrently and independently to provide the candidates. The applications' user interfaces and functionalities are decoupled. For example, the applications' appearance styles, such as skins of the user interfaces, may be different from each other and/or different from that of the IME.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
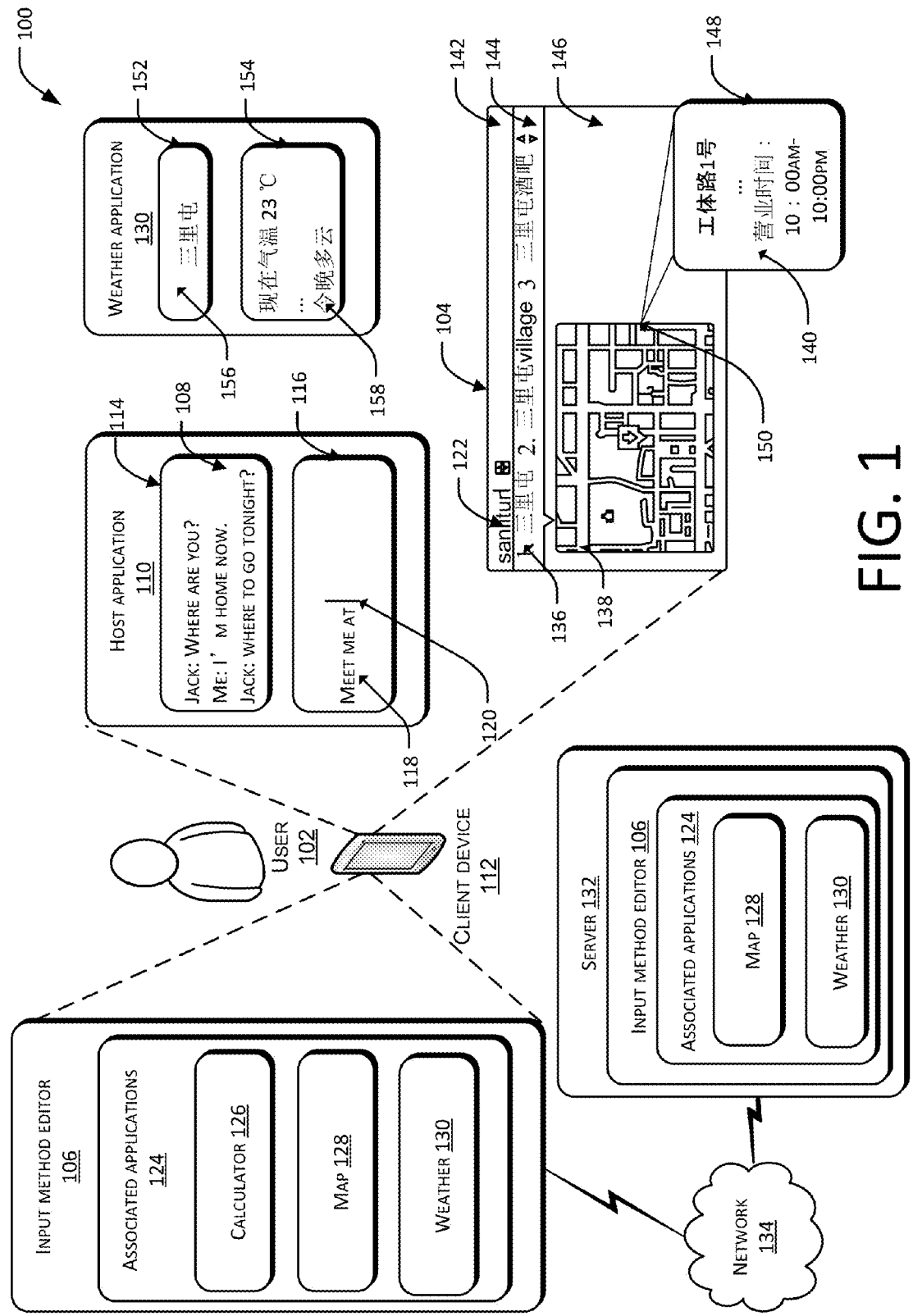
FIG. 1 illustrates an example overview of providing candidates to a user through an example input method editor (IME) at an example chatting scenario.

The disclosed techniques describe an input method editor (IME) that provides candidates to a user for input into another computer application, i.e., a host application. The IME provides candidates at least partly based on one or more parameters. The IME may collect the one or more parameters that may include, for example, a query input by the user into the IME, a scenario of the host application (e.g., chatting or emailing), a context of the user input (e.g., a prior use history of the computing application such as chatting history or contents displayed at the user interface of the computer application such as the user's prior inputs), and/or a language mode (e.g., English or Chinese for the desired candidates). Candidates and their rankings for display positions among multiple candidates may also be generated or identified based on the combination of parameters for a current user input. For example, a same query input by the user into the IME at different scenarios may have different candidates and/or candidate rankings.

The IME may have or call one or more engines to search candidates based on the one or more parameters. The engines search a local database and/or a network to provide candidates based on different settings and configurations. In addition, one or more applications may be associated with the IME to provide extended functionalities to the IME. Each application may have or call its one or more engines to provide additional candidates. A graphical user interface of an application store may be available to the user to select and associate the applications in which the user is interested with the IME. For example, the selected application may be installed with the IME. Alternatively, one or more applications may be pre-installed or embedded into the IME. There are various installation configurations of the applications at the IME. In one example, some applications are installed at the IME in an executable file format. In another example, a file in a form of declarative markup language may be used to describe one or more characteristics of the one or more applications associated with the IME and to enable behaviors of the associated applications. The file, which may be called a manifest file herein, is human-readable and editable. Characteristics of the one or more applications associated with the IME and represented in the manifest file may include, for example, a condition when a particular application is qualified to run or be selected by the IME and a preset score or ranking of the particular application under a particular combination of one or more parameters relating to the user input.

Based on the collected one or more parameters, the IME may calculate a score and/or a ranking of some or all associated applications and/or the engines of the IME. The IME may select its own engine or one or more applications whose scores or rankings are higher than a preset threshold to provide the candidates. An application configuration interface may be available to the user to manage the associated applications including editing their characteristics described in the manifest file.

In addition, the user may directly select and launch one or more applications from the IME to request such applications to provide additional candidate based on the one or more parameters. Such launched applications may have their own stand-alone user interfaces, different from the interface of the IME, such that the user can input queries and receive candidates from the launched applications.

Multiple selected and/or launched applications may run concurrently and independently to provide the candidates. In one example, the functionality to provide candidates is decoupled from the functionality of appearance styles of the user interfaces such as skins of the user interfaces. For example, the skins of the user interface may define the appearance, such as color and size, of a display window of the user interface. In other words, the appearance styles of the multiple applications may be different from each other and/or different from that of the IME.

The IME and/or the selected application may provide candidates based on the one or more parameters. The candidates may include one or more text candidates, rich candidates, and/or informative candidates. The text candidates are expressions represented by or associated with the query in the form of text and may include non-Lain characters such as Chinese and Latin characters such as English. The rich candidates are the expressions represented by or associated with the query in forms other than text and may include images or multimedia to provide supplemental information to a user to enhance the user experience. The user may select one or more text candidates and rich candidates as input into the user interface of the host application. The informative candidate provides information, such as background or detailed illustration, of another candidate to the user. For example, the user may intend to learn information of a specific text or rich candidate. After the user indicates his interest, a respective informative candidate is provided to the user for reference.

After the IME receives the generated or identified candidates from its own engine and/or the selected applications, the IME may display them through the user interface of the IME. The IME may have one or more display windows to display the candidates. For example, the IME may have a text candidate window to display the text candidates, a rich candidate window to display the rich candidates, and an informative candidate window to display the informative candidates. Unless contradicted with the descriptions herein, details of text candidates and rich candidates are described in U.S. patent application Ser. No. 13/331,023, Scott, et al. "Scenario-adaptive input method editor," which is incorporated herein.

The one or more display windows may present concurrently with the IME or be available when the IME determines that there are corresponding types of candidates to be displayed. In some examples, the informative candidate window may appear and display the informative candidates only when the user indicates he/she is interested in learning more information associated with one particular candidate and the IME determines that there exists such an informative candidate.

After the IME receives a selection from the user for one or more displayed candidates such as text or rich candidates, the IME inserts the selected candidate into the user interface of the host application as the user input. The IME may insert the selected candidate into the host application in an optimal format supported by the host application.

There may be various configurations for the deployment of the IME, the application store, and/or the applications. In one embodiment, all components of the IME, the applications, and/or the application store are located at a client device. In another embodiment, each of the IME, the applications, and/or the application store may be implemented in a client-server architecture in which some components are located at the client device and some components are located at the remote server relative to the client device.

Example Scenario for User Input by Using IME

FIG. 1 illustrates an example overview 100 of providing candidates to a user through an example input method editor (IME) in an example chatting scenario. The user 102, via a user interface 104 of an IME 106, inputs one or more objects 108 into a user interface of a host application 110. Both the user interface 104 of the IME 106 and the user interface of the host application 110 present at a user interface of a client device 112 at a same time. The user 102 may use a mouse, a touch-screen, voice, or any other inputting technique to make the user input.

In the example of FIG. 1, the host application 110 is a chatting application such as Microsoft MSN®. The user interface of the host application 110 includes two windows, a chatting window 114 and an input window 116. The chatting window 114 displays the objects 108 which are already input into the user interface of the host application 110. The objects 108 may include text and/or rich objects. In the example of FIG. 1, the objects 108 are text objects "Jack: Where are you?," "Me: I'm home now." "Jack: where to go tonight?" "Jack" is a user name of the opposing party that is chatting with the user 102. "Me" is a representation of the user 102.

The input window 116 includes one or more input objects 118 that are to be input into the chatting window 114 as the objects 108. In the example of FIG. 1, the input objects 118 are text objects "meet me at." An input indication 120, represented by "|," represents an indication of a place to insert the next input objects 118. The input indication 120 may be, for example, a focus of input technique such as a mouse to input next input objects 116. The input indication 120 also indicates that the host application 110 that contains the input indication 120 among some other miming computer applications is the one that receives input objects 118 from the IME 106.

The user 102 may use the IME 106 to provide the input objects 118. For example, the user 102 inputs a query 122 into the user interface 104 of the IME 106. The IME 106 presents one or more candidates at the user interface 104 to be selected by the user 102 as the input objects 118 into the input window 116 of the host application 110. In addition, one or more applications 124 may be associated with the IME 106 to provide extended functionality such as additional candidates to the IME 106. The one or more associated applications 124 may be selected by the user 102 from an application store (not shown in FIG. 1) that includes a plurality of applications. Alternatively, the one or more applications 124 may be pre-installed with the IME 106 at the client device 112.

In the example of FIG. 1, the associated applications 124 include a calculator application 126, a map application 128, and a weather application 130. Each of the IME 106 and the applications 124 may be implemented in a client-server architecture in which some components are located at the client device 112 and some components are located at a server 132 that communicates with the client device 112 through a network 134. The network 134 may be an intranet or Internet. In the example of FIG. 1, the calculator application 126 resides at the client device 112 while the IME 106, the map application 128, and the weather application 130 have components residing at both the client device 112 and the server 132.

The user 102 inputs the query 122 into the user interface 104 of the IME 106 by using any inputting technique. The query 122 may be any kind of inputs, such as text, multimedia, or audio input by the user 102. For example, the query 122 may represent a series of initial characters, an abbreviation, a spelling, and/or a translation of the text candidates 136. In the example of FIG. 1, the query 122 is an English character string, "sanlitun," which represents a spelling or pronunciation of the Chinese characters "三里屯"

The IME 106 collects one or more parameters relating to the input from the user 102 and selects at least one of the associated applications 124 to provide one or more candidates to the user 102 based on the one or more parameters.

For example, the one or more parameters may include the query 122 and a scenario of the user input. The scenario of the user inputs may include a scenario of the host application 110, i.e. chatting in FIG. 1. The one or more parameters may also include a context of the input of the user 102, such as the previous inputs made by the user 102 and the opposing party "Jack" at the user interface of the host application 110. In the example of FIG. 1, the IME 106 may capture the objects 108 that are already input into the chatting window 114 of the host application 110, the input objects 118 at the input window 116 of the host application 110, or both, to obtain the context of the input.

The one or more parameters may also include a language mode, e.g., English or Chinese, to indicate the language of the user input. For example, if the language mode is simplified Chinese, the selection and ranking priority has a preference to simplified Chinese characters, a preference of expression style under simplified Chinese, or a preference to a data source from a webpage having simplified Chinese characters. In contrast, if the language mode is traditional Chinese, the selection and ranking priority has a preference to traditional Chinese characters, a preference of expression style under traditional Chinese, or a preference to a data source from webpages having traditional Chinese characters.

The one or more parameters may further include a previous use history of the host application, such as a chatting history when the host application 110 is a chatting application.

The IME 106 may calculate scores for some or all of the applications 124 and rank them based on at least one of the one or more parameters. The IME 106 may select one or more applications from the applications 124 that have scores higher than a score threshold and/or rankings higher than a ranking threshold to provide one or more candidates to the user 102.

The selected application may further identify or generate the one or more candidates to the user 102. In other words, the candidates may be provided by one or more engines called by the IME 106, one or more selected applications from the applications 124, or both. The selection and ranking of the candidates by the IME 106 and/or the selected application may also be based on the relevancies of the candidates to the one or more collected parameters. For example, a text candidate or rich candidate with higher relativity with the scenario of the host application 110 may be ranked with a higher priority than other candidates in the text candidates 136 and/or the rich candidates 138 to be presented to the user 102

The candidates presented at the user interface 104 of the IME 106 may include one or more text candidates 136, one or more rich candidates 138, and/or one or more informative candidates 140. The user 102 may select one or more candidates from the text candidates 136 and/or the rich candidates 138 as the input objects 118 to be input into the input window 116 of the host application 110.

The text candidates 136 may be any kind of text such as Latin characters (e.g. English), non-Latin characters (e.g. Chinese), symbols, numbers, or a mix of different kinds of texts. The query 122 and the text candidates 136 may be the same language or different languages.

The rich candidates 138 may include pictures, maps, videos, and/or other forms of representations in addition to text that provide supplemental information to the user 102 in addition to the text candidates 136.

The informative candidates 140 are used to illustrate or provide information of the query 122, a text candidate 136, or a rich candidate 138. For example, the user 102 may use the input technique such as the mouse to point to a respective text candidate 136 or rich candidate 138 to show that the user 102 wants to know more information associated with such candidate. Then the IME 106 and/or a selected application may present the informative candidate 140 to the user. In some examples, if the user 102 is interested in learning information associated with some contents such as words or multimedia within the informative candidate 140, the user 102 may continue to point to such contents to obtain another informative candidate (not shown in FIG. 1) to illustrate the informative candidate 140.

As the informative candidates 140 are for illustration purpose, they usually cannot be directly selected by the user 102 as the input objects 118. However, in some examples, the user 102 may still select and insert them as the input objects. For example, the user 102 may copy contents of the informative candidates 140 and paste them into the user interface of the host application 110 as the input objects 118.

In the example of FIG. 1, based on the collected parameters such as the context of the user input including the input objects 118 "Meet me at," the IME 106 may determine that the query 122 "sanlitun" refers to a location and the map application 128 has the highest relativity score among the applications 124. The IME 106 selects the map application 128 from the associated applications 124 to provide extended functionalities including additional candidates. The map application 128 may call its client components or server components or call web services to provide candidates based on the query 122 "sanlitun" and one or more other parameters. For example, the map application 128 may call a web service with an engine tuned to map functionality to search "sanlitun." The web service may be a search engine that is tuned to map searching. In another example, the map application 128 may also use one or more text candidates 136 such as "三里屯" as the query or even one or more rich candidates 138 (not shown) as the search term.

In the example of FIG. 1, the text candidates 136 include a first text candidate "三里屯," a second text candidate "三里屯 village," and a third text candidate "三里屯酒吧," which means "sanlitun bar" in English. The text candidates 136, for example, may be provided by the engine of the IME 106 based on the query 122 and the language mode of the IME for the query 122 and/or some other parameters. Alternatively, the text candidates 136 may be provided by a text candidate application (not shown in FIG. 1) that overrides the functions of the IME 106 to provide the text candidates 136. The ranking of the three text candidates in the text candidates 136 is based on their relativities to the collected one or more parameters. As the language mode in the example of FIG. 1 is simplified Chinese, the provided text candidates 136 are mainly Chinese characters although there still might be some English characters, such as the "village" in the second text candidate.

In the example of FIG. 1, the selected application, i.e., map application 128, provides the rich candidate 138, i.e., a map "三里屯" The map application 128, based on the query 122 and/or other parameters, generates or identifies a map of "三里屯 三里屯." Based on some other parameters such as the context of the user input, the map application 128 may further generate another map showing a route from a current location of the user 102 and/or "Jack," the other person who is communicating with the user 102 through the host application 110, to "三里屯" (not shown in FIG. 1).

After the candidates are generated, identified, and ranked by the IME 106 and/or the selected applications, the IME 106 displays them through the user interface 104 to the user 102 in a format suitable to the type of the candidate.

In the example of FIG. 1, the user interface 104 of the IME 106 may include a composition window 142 to receive and present the query 122, a text candidate window 144 to display the text candidates 136, and a rich candidate window 146 to display the rich candidates 138. The text candidate window 144 and/or the rich candidate window 146 may appear concurrently with the composition window 120. Alternatively, the text candidate window 144 and/or the rich candidate window 146 may present only when there are corresponding text candidates 136 or rich candidates 138 available.

The user interface 104 of the IME 106 may further include an informative candidate window 148 to display the informative candidate 140. In the example of FIG. 1, when the user 102 identifies a point of interest 150, such as a restaurant, on the rich candidate 138, i.e., the map of "三里屯," the IME 106 may display the informative candidate 140 associated with the point of interest 150 such as an address and operation hours of the restaurant, i.e., "工体路1号 . . . 营业时间: 10:00 am-10:00 pm" which means "No. 1, Gongti Road . . . Business hours: 10:00 am-10:00 pm" in English in the informative candidate window 148.

In addition to the approach that the IME 106 automatically selects one or more applications from the applications 124, the user 102 may directly select and launch one or more applications from the applications 124. For example, the IME 106 may provide an interface (not shown in FIG. 1) to the user 102 to directly select and launch one or more applications from the applications 124. In the example of FIG. 1, the user 102 directly selects the weather application 130 from the interface provided by the IME as the user 102 may want to know weather information. The launched weather application 130 may be presented at the user interface of the client device 112 in a stand-alone interface separate and independent from the user interface 104 of the IME 106.

In the example of FIG. 1, the launched weather application 130 may include a query window 152 and a display window 154. The query window 152 receives a query 156 which may be the same or different from the query 122. For example, the IME 106 may automatically send a copy of the query 122 to the query window 152 as the query 156. Alternatively, as shown in FIG. 1, the user 102 may directly input the query 156 or use IME 106 to input the query 156 into the query window 152. In the illustrated example, in query window 152, query 156 "三里屯," represents the Chinese character of "sanlitun." The display window 154 displays one or more candidates 158 provided by the weather application 130 based on the query 156 and/or some other collected parameters, such as the scenario of the host application 110, the context of the user input, etc.

In the example of FIG. 1, the candidates 158 provided by the weather application 130 may include current weather and weather forecast of the location represented by "三里屯," e.g. "现在气温 23 C . . . 今晚多云," which means "current temperature 23 Celsius . . . tonight cloudy" in English. The weather application 130 takes into account the parameter of a language mode, for example, simplified Chinese, and presents the candidates 158 not only in simplified Chinese characters but also in expression styles preferred in simplified Chinese. For instance, Celsius instead of Fahrenheit is the preferred expression for temperature under simplified Chinese. The weather application 130 also takes into account the parameter of context of the user input, e.g., based on the input objects "meet me at," the weather application 130 predicts that the user 102 would like to know the weather forecast and provides "tonight cloudy" information in the candidates 158. The user 102 may view the candidates 158 as an additional information source or may select one or more candidates 158 as the input objects 118 to be input into the user interface of the host application 110.

When the user 102 points to the query 152 or the candidates 158, another informative candidate (not shown in FIG. 1), if available, may also be presented to the user 102 in another informative candidate window (not shown).

Example methods and computing systems for performing techniques described herein are discussed in detail below. The IME 106 in FIG. 1 may use, but is not limited to, the techniques described below to implement its functionalities. The techniques by reference to each figure described herein may be independent from or combinable with the techniques discussed under other figures. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Example Techniques for Providing Candidates

Figure 2:
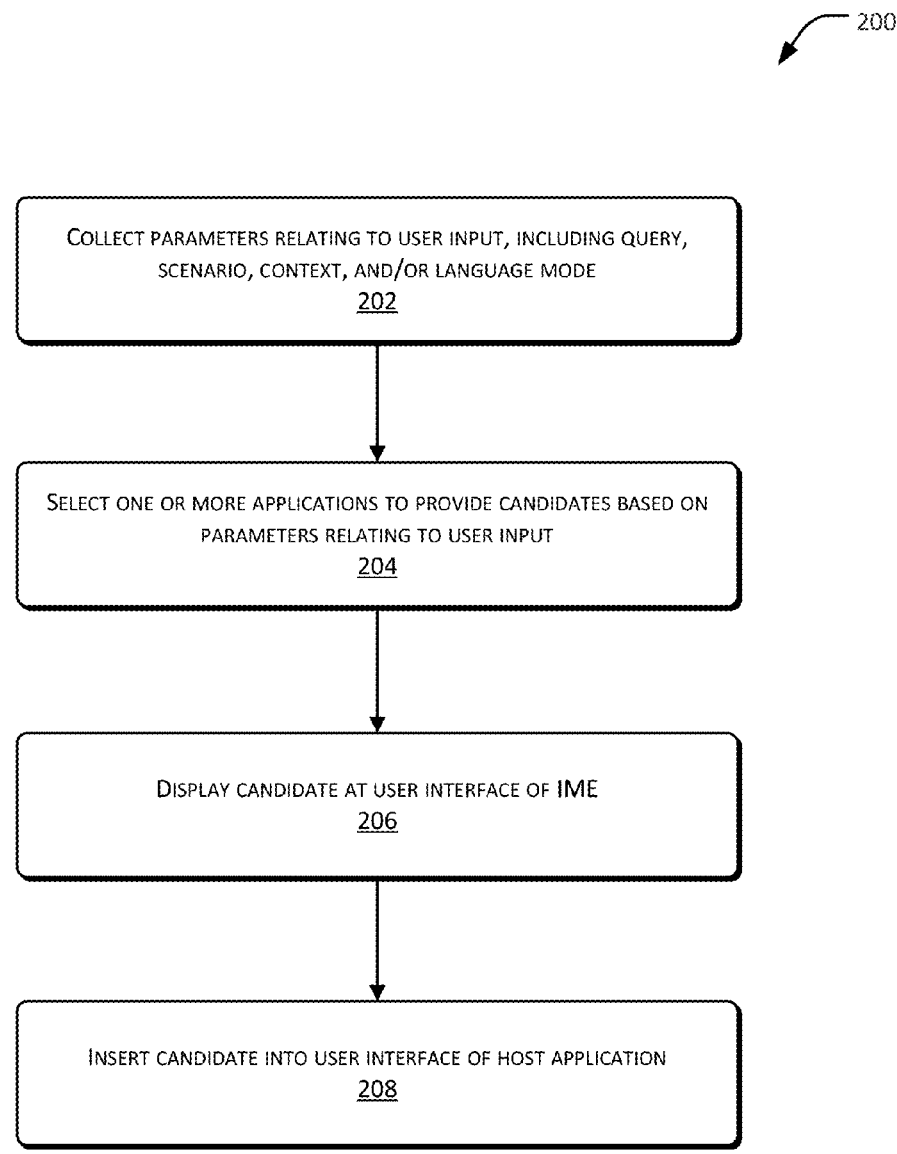
FIG. 2 illustrates a flowchart of an example method for providing one or more candidates to the user.

FIG. 2 illustrates a flowchart of example method 200 for providing one or more candidates to a user. At 202, the IME collects one or more parameters relating to the user input. In an example implementation, the IME has multiple runtime states. Operations at 202 correspond to a query state of the IME during which a computing system of the IME listens to input by the user, captures the input, prepares an enhanced query of the input including the one or more collected parameters, and sends the enhanced query for further processing. The one or more parameters, for example, may include the query input by the user, the scenario of the user input such as the scenario of the host application, a context of the user input, and/or a language mode. There are various alternatives to prepare the enhanced query for further processing. In one example, the IME may pre-select one or more qualified applications in an ordered list that are qualified to be activated to process the enhanced query in the query state and further choose one or more applications from the qualified applications in a service state which is described in detail below. The ordered list may be called contender's vector as each of the qualification applications acts as a contender.

In another example, in the query state, the IME collects the multiple parameters without pre-selecting an application and chooses the one or more applications from a plurality of applications in the service state.

In the example of FIG. 1, the IME 106 may identify the host application 110 that receives the input objects 118 among multiple computer applications opened at the interface of the client device 110. The IME 106 may, for example, check the input indication 120 to identify the host application 110. After identification of the host application 110 to receive the input objects 118, the IME may collect data relating to the scenario of the host application 110, such as the name and version of the host application 110. In the example of FIG. 1, for instance, the name of the host application 110 is Microsoft MSN®, and the version of the host application 110 is MSN Messenger 7.5 for Windows XP®. The IME 106 may compare the name of the host application 110 to a local or remote database to determine that the host application 110, i.e., Microsoft MSN®, is a chatting application. For example, the name of the computer application may be compared to a list of scenarios. The list of scenarios stores the corresponding relationships between the computer applications and scenarios. For instance, the list may indicate that the computer application Microsoft MSN® corresponds to the scenario of chatting, and the computer application Microsoft Word® corresponds to the scenario of document editing. Such a list of scenarios may be updated periodically to include the corresponding relationships with new computer applications and to update the corresponding relationships.

The IME 106 may also capture current contents displayed at the user interface of the host application 110, such as the objects 108 in the chatting window 114 and the input objects 118 at the input window 116. For example, the IME 106 may use screen pixel information based on visual understanding techniques such as OCR to identify the displayed contents. In the example of FIG. 1, the IME 106 may capture the chatting displayed at the interface of the host application 110, such as the input objects 108 "Jack, where are you? Me: I am home now. Jack: where to go tonight?"

The IME 106 may also collect a previous user history of using the host application 110. Such user history may be stored locally or remotely, and may be helpful to analyze the context of the recent inputs. For example, when the host application 110 is Microsoft MSN®, the user history may be a chatting history of the user.

The contents displayed at the user interface of the host application 110 and the previous user history may also be used to identify the scenario of the host application 110. For example, based on the context of the contents displayed at the user interface of the host application 110, the IME may determine that it is a scenario of chatting based on a pattern of chatting identified from the objects 108 in the chat window 114.

At 204, the IME selects one or more applications from a plurality of applications to provide candidates based on the collected parameters. Operations at 204 may correspond to a service state of the IME during which the computing system of the IME receives the enhanced query including multiple parameters relating to the user input, processes the enhanced query, selects one or more engines from the applications and/or the engines of the IME to provide candidates, processes candidate responses from the selected one or more engines, packages the candidate responses from the selected engines, and returns the responses into a proper form to be processed at a display state which is described in detail below.

In the example of FIG. 1, the IME 106 may calculate scores of some or all of the applications 124 and rank them based on at least one of the one or more parameters. The IME 106 may select one or more applications from the applications 124 that have scores higher than a threshold or rankings higher than a threshold to provide one or more candidates to the user 102. The selected application may identify or generate the one or more candidates by using the query 122 and/or some other parameters. In one example, the IME may be restrained to select one application with a highest score or ranking to provide candidates. In case there are multiple particular applications having the same highest score or ranking, a server component of the IME may make a decision based on factors outside control of the multiple applications. For instance, the IME may analyze other users' selections under the same or similar scenarios to make the selection.

Some of the selected applications may be already associated with the IME, such as the associated applications 124 in FIG. 1. In some other examples, some of the selected applications may not have been associated with the IME. The IME may prompt a message at the user interface of the IME to request the user to install a particular application or may automatically install such application. The IME may also check a version number of the application to determine whether it is supported at a particular client component of the IME. If it is not supported, the IME may prompt another message at the user interface of the IME to request the user to update the client component or may automatically update the client component of the IME.

At 206, the IME displays the one or more candidates using the user interface of the IME. Operations at 206 correspond to a display state of the IME during which the computing system of the IME receives the resulting response from the service state, preprocesses, displays the resulting response, and listens and responds to a user interaction at a user interface of the IME. There are various techniques to display the candidates.

For example, the IME may have a text candidate window to display text candidates, a rich candidate window to display rich candidates, and an informative candidate window to display informative candidates. The IME may present the text candidate window and/or the rich candidate window when there are corresponding text candidates and/or rich candidates. In another example, the IME may present the text candidate window and the rich candidate window even when there are no corresponding text candidates and/or rich candidates.

The IME may present the informative candidate window to display the informative candidate associated with a respective candidate when receiving an indication that the user is interested in learning more about the respective candidate. Alternatively, such informative candidate window may automatically present with the respective candidate when there is a corresponding informative candidate associated with the respective candidate, regardless of whether the user points to the respective candidate. For example, the informative candidate window and/or the respective candidate may be translucent and the informative candidate window may be displayed in close proximity to the respective candidate.

In one example, the user interface of the IME provides one text candidate window, one rich candidate window, and/or one informative candidate window. The IME receives the text candidates from different selected applications and/or its own engine, ranks them based on the one or more collected parameters, and displays them in one text candidate window. Similarly, the IME receives the rich candidates from different selected applications and/or its own engine, ranks them based on the one or more collected parameters, and displays them in one rich candidate window. In another example, each of the applications may have its own text candidate window, rich candidate window, and/or informative candidate window. The candidates provided by a particular application are also ranked by the particular application and displayed in the corresponding candidate window.

There are various presentation styles, such as skins, applicable to the display of candidates described herein. In one example, the IME may provide a uniform presentation style to the applications. In another example, each of the selected applications and/or the IME may have separate and independent presentation styles, such as skins, to display their generated or identified candidates in the display windows respectively. For example, the IME and the applications may have separate display windows such as text candidate windows, rich candidate windows, or informative candidate windows to display their corresponding candidates. For instance, the rich candidate window 146 displays the rich candidates 138 provided by the map application 128. The presentation style, such as a skin, of the rich candidate window 146 may be different from the text candidate window 144 that displays the text candidates 136 provided by another application or the IME 106. For another instance, the presentation style of the candidate window 154 of the weather application 130 launched by the user 102 in a stand-alone window may be different from that of the text candidate window 144 and the rich candidate window 146 at the user interface 104 of the IME 106. The IME may further provide an interface to the user to select different presentation styles such as different skins for different applications. The user may choose different available skins for the IME and the applications respectively.

At 208, the IME receives an indication that the user has selected one or more candidates from the displayed candidates, and inserts the selected candidates into the user interface of the host application. Operations at 208 correspond to an insertion state of the IME during which the computing system of the IME makes an insertion request into the host application after receiving a user interaction at the display state. For example, the IME may check the forms or formats supported by the host application, and format the selected candidates in an optimal format supported by the host application.

Example Application Store

Figure 3:
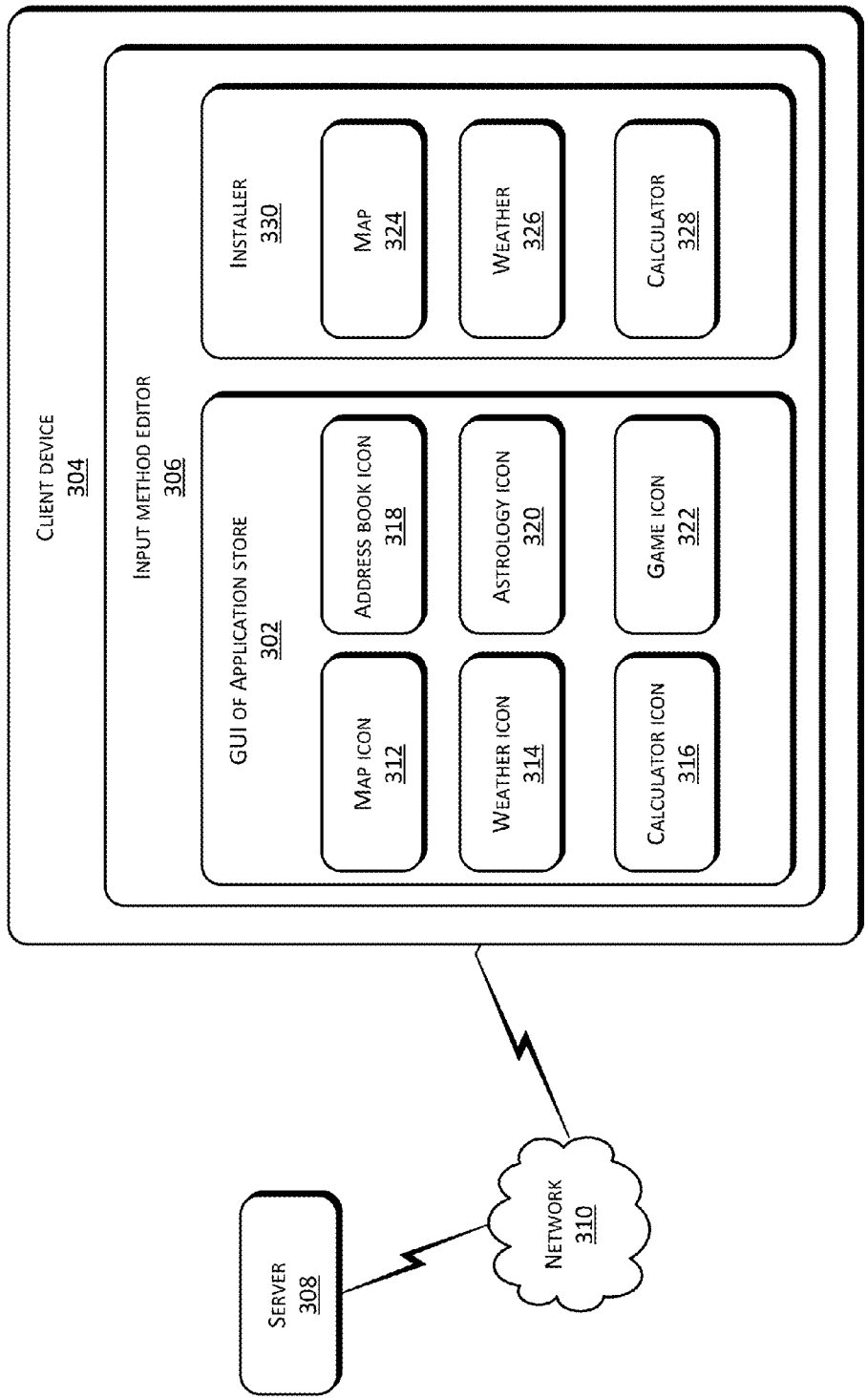
FIG. 3 illustrates an example application store from which a user may select one or more applications to be associated with the IME.

FIG. 3 illustrates an example application store from which the user may select one or more applications to be associated with the IME. A graphic user interface (GUI) of an application store 302 is presented at a user interface of a client device 304. The applications 124 in FIG. 1 may be selected from the GUI of the application store 302 as presented herein.

In the example of FIG. 3, the application store 302 may be part of an input method editor (IME) 306 and can be launched from a user interface of the IME 306. Alternatively, the application store may be an application independent from the IME 306.

The GUI of the application store 302 includes one or more icons and each of the icons represents a respective application that is available to the user for selection. Some of the applications may be already available at the client device 304. For example, one or more applications are already pre-installed at the IME 306 and do not require a user selection. For another example, some applications may reside at a remote server. The user selects an icon representing his/her desired application to download the application or its client component from a server. In the example of FIG. 3, the IME 306 may download the selected applications from a server 308 that is connected with the client device 304 through a network 310. The server 308 may host both server components of the IME 306 and the plurality of applications available through the application store. In another example, each respective application may be hosted by a different server and thus the IME 306 may download applications from different servers where the corresponding applications reside.

In the example of FIG. 3, the GUI of the application store 302 lists a plurality of applications including a map application icon 312, a weather application icon 314, a calculator application icon 316, an address book application icon 318, an astrology application icon 320, and a game application icon 322.

After the user selects his/her desired application icons, such as the map application icon 312, the weather application icon 314, and the calculator application icon 316 in FIG. 3, at the GUI of the application store 302, one-by-one or in a batch, applications represented by such selected icons, i.e., a map application 324, a weather application 326, and a calculator application 328, are installed at the client device 304. If the selected applications utilize a client-server structure, the client components of the applications are downloaded from the server 308 while the server components (not shown in FIG. 3) still remain at the server 308.

In the example of FIG. 3, the IME 306 may have an installer 330 to manage downloading and installing the selected applications. For example, the installer 330 may download a zipped file of respective particular application from the server 308, and unzip the zipped file in a designated category of memory at the client device 304.

In one example, as shown in FIG. 1, the client components of the applications may be installed together with or as part of the client component of the IME 306 at the client device 304. Alternatively, the client components of the applications and the client component of the IME may be installed as independent entities at the client device. Similarly, the server components of the application may be installed together with or as part of the server component of the IME. Alternatively, the server components of the applications and the server component of the IME may be independent entities at the server or reside at different servers.

Some of the applications may be domestic or online service, such as Bing® map, that do not require a registration of the user to use. Some of the applications may be domestic or online services that require the registrations of the user to use, or that require the registration of the user to provide more functionality based on prior saved user preferences, historic data, etc. The IME 306 or the application may pre-store the authentication credentials of the user to log onto and use such services.

Example Manifest File Describing Application Characteristics

Various application configurations may be installed at the IME. In one example, some applications are installed at the IME in an executable file format. In another example, the IME may use a file in a form of declarative markup language, such as the Extensible Markup Language (XML), to describe one or more characteristics of the one or more applications associated with the IME. The markup language file is human-readable and editable, and is called a manifest or manifest file herein. The manifest file is a self-describing document. It is the starting point when loading a respective application, and is interpreted by the computing system of the IME at the client device and/or the server in a declarative way to enable application behaviors. It is also used to automatically expose configuration information about the respective application. The manifest file may reside at both the client and the server components of the computing system of the IME.

The manifest file may include a manifest schema and a manifest. The manifest schema, which is in the form of declarative markup language, describes the manifest features supported by the computing system of the IME. The manifest describes a particular application. The features in the manifest for the particular application shall comply with the specification in the manifest schema. The manifest for the particular application may be an independent file from the manifest schema. Alternatively, the manifests for different applications and the manifest schema may be combined in one manifest file. The manifest schema may expose enumerations for supported scenarios. An application developer of the applications may refer to the manifest schema as a baseline reference to the current capability of the computing system of the IME.

Figure 4:
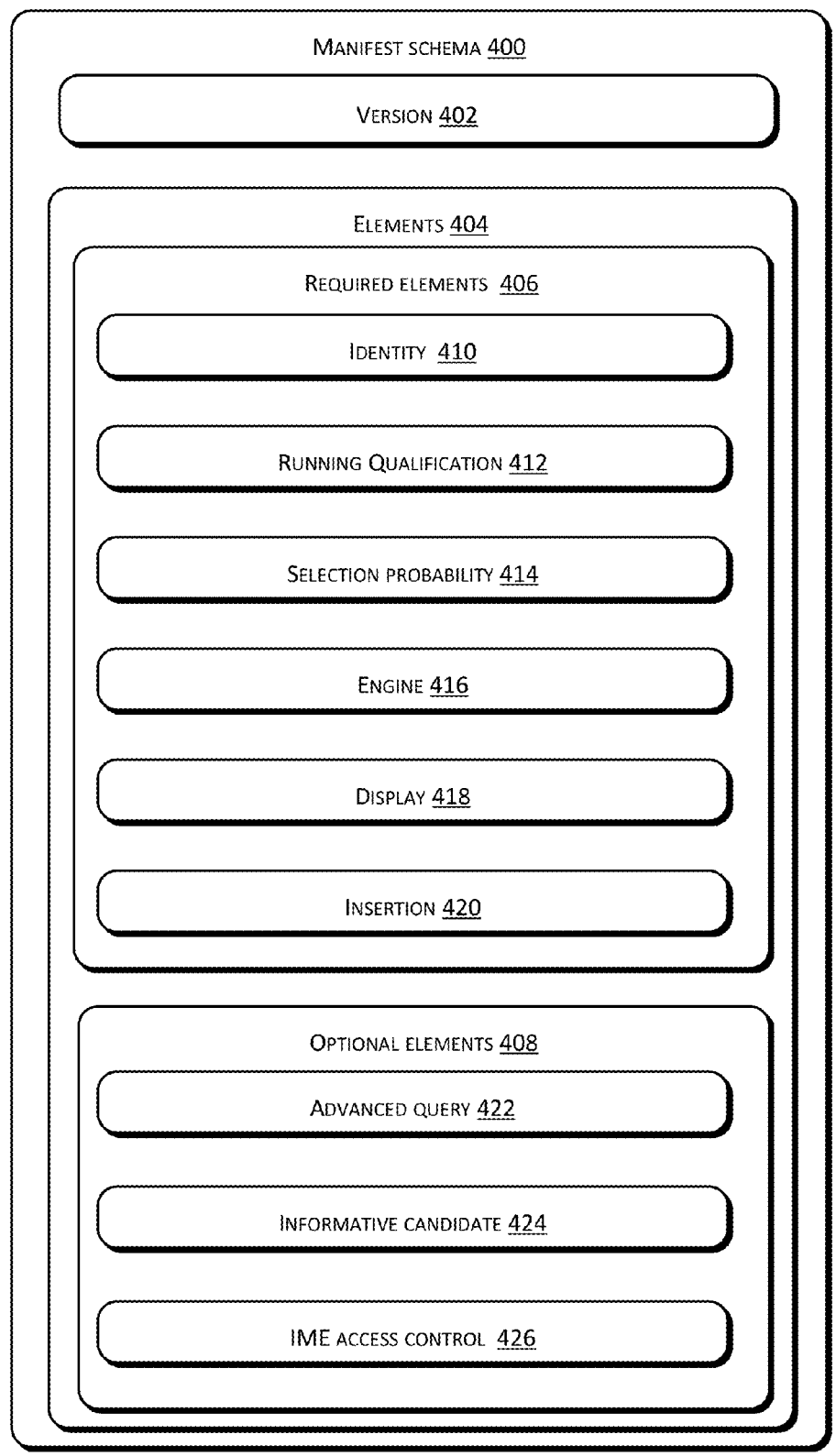
FIG. 4 illustrates an example manifest schema that describes characteristics of the applications associated with the IME.

FIG. 4 illustrates an example manifest schema 400. The manifest schema 400 includes a version 402 such as a version number and various elements 404 that act as templates to stipulate specifications that the manifest for a particular application shall comply with. The various attributes in the manifest file for a particular application enable the characteristics of the particular application during its runtime states at the IME. The elements 404 include various required elements 406 that the manifest for each application associated with the IME shall have and optional elements 408 that the manifest for each application associated with the IME may optionally have.

In the example of FIG. 4, the required elements 406 include an identity element 410, a running qualification element 412, a selection probability element 414, an engine element 416, a display element 418, and an insertion element 420. The optional elements 408 include an advanced query element 422, an informative candidate element 424, and an IME access control element 426. In different manifest schemas, the number and types of required elements and the optional elements may be different and some elements may be the required elements in one example and the optional elements in another example.

The version 402 describes a current version of the manifest schema 400. For example, the manifest schema 400 may reside at a server of the computing system of the IME. A client device of the computing system of the IME may have a local manifest schema previously downloaded from the server.

As the manifest schema defines the specifications of the applications supported by the computing system of the IME, the computing system of the IME checks whether the version of the local manifest matches the version of the manifest schema 400 stored at the server. If the two versions of the manifest schema at the client device and server do not match, the computing system of the IME updates the local manifest schema to the latest version and/or checks whether the two versions are compatible. If the versions of the manifest schema at the client device and the server do not match and are incompatible, the computing system of the IME may disable the IME or request the user to install the IME with the latest version of manifest schema.

For example, if the versions of the manifest schema at the client device and the server do not match, the computing system of the IME checks whether the client component of the IME has been updated but the local manifest schema is not updated. If it is determined that the client component of the IME has been updated but the local manifest schema is not updated, the computing system of the IME updates the local manifest schema to the latest version of the manifest schema 400. For example, the client component of the IME checks an update element in the local manifest schema. If the update exists, the IME may prompt the user to download the latest version of the manifest schema 400 or the manifest schema 400 may be automatically downloaded from the server to the client depending on attributes in the update element. Optionally, the manifest schema 400 may be downloaded or installed in the background.

If the latest version of the manifest schema supported by the client component of the IME is downloaded and installed and it still does not match the server version of the manifest schema 400, it is possible that an updated version of the client component of the IME exists and the computing system of the IME will check for the latest version of the client component of the IME, and if such version exists, it will prompt the user to update the client component of the IME to support the manifest schema 400.

The various elements 404 as shown in FIG. 4 are root level elements of the manifest schema 400. Each element may have one or more sub-elements, which are not described in detail below. In the example of FIG. 4, the identity element 410 is a required element that describes an identity of a respective application. The running qualification element 412 is a required element that declares one or more conditions when the respective application is qualified to run or should be considered for activation.

The selection probability element 414 is a required element that provides a probability under what combination of parameters such as input and context conditions should the respective application be considered a contender for servicing. Particularly, it may declare or calculate "scores" for different types of input and context. In short, it has a language for leveraging semantic labeling and also regular expressions.

The engine element 416 is a required element that declares whether the engine of the application is located at the client device, the server, or both. If the engine is at the local device, the engine element 416 may further declare the "hooks" needed and capabilities required, for example, for storage and network access. The engine of a respective application provides the candidates based on the collected one or more parameters by the IME and/or the respective application.

The display element 418 is a required element that declares how the computing system of the IME will display this particular application. It takes into consideration scenarios of different host applications and describes how to transform the presentation according to the scenarios. In this way, the host application may have influence on how candidates are displayed.

The insertion element 420 is a required element that declares how to transform the data from the chosen candidate into a form the host application can accept and declares whether the candidate can be transformed "optimally" into the host application according to the scenario. For example, an email candidate might be transformed into a special email link in an email program, or plain text in a simple note taking program.

The advanced query element 422 is an optional element that declares certain kinds of additions needed to enhance the query that would be formed if the particular application is a contender for servicing. For example, the local text candidates generated by the IME could be sent for servicing, as well as some of the context, e.g. the left n-grams or the previously written M characters of text in the queries of the IME or the host application. The n-gram is a contiguous sequence of n items from a given sequence of text, where n and M can be any integer and be stipulated in the advanced query element 422.

The informative candidate element 424 is an optional display element related to the informative candidate which is also referred to as tooltip herein. It declares how to render a special tooltip for the candidates generated by the particular application. For example, it provides a way for the user to obtain information about a candidate on mouse hover or keyboard shortcut indicated by the user.

The IME access control element 426 is an optional element that declares whether the application requires lower level scripting capability. For example, the IME access control element 426 may point to a JScript file within an application package and a callback function so that it can be activated. JScript is Microsoft®'s implementation of the script language that is used in Microsoft®'s Internet Explorer®. JScrpt is just an example here. Any other script language file such as JavaScript ActionScript may also be used.

Because the IME access control element 426 may allow modification of any part of the IME, only one application with enabled characteristics under the IME access control element 426 may be loaded at any time, and the IME, based on the IME access control element 426. will alert the user that the particular application requires special permission. The usefulness of this element is typically seen in enterprises which need additional augmentation of the IME for IT needs, such as universal deployment, overwriting, or prohibiting an individual configuration of the particular application or the IME for security reasons.

An example manifest schema is shown below in Table 1 Example Manifest Schema Implementation. In Table 1, the identity element 410 is named "Identity," the running qualification element 412 is named "When Run," the selection probability element 414 is named "LikelihoodQuickCheck," the engine element 416 is named "Engine," the display element 418 is named "Display," the insertion element 420 is named "Insertion," the advanced query element 422 is named "QueryAugmentation," the informative candidate element 424 is named "Tooltip," and the IME access control element 426 is named "CustomScript." Table 1 shows that the example manifest schema provides the templates for different elements and their corresponding sub-elements and attributes that the respective application shall have or support.

TABLE 1

Example Manifest Schema Implementation

```xml
<?xml version="1.0" encoding="utf-8"?>
<xs:schema attributeFormDefault="unqualified"    elementFormDefault="qualified"
targetNamespace="http://schemas.microsoft.com/ime/extensions/1.0"
xmlns:xs="http://www.w3.org/2001/XMLSchema">
<xs:element name="ImeExtension">
    <xs:complexType>
        <xs:sequence>
            <xs:element name="Identity">
                <xs:complexType>
                    <xs:sequence>
                        <xs:element name="Uid" type="xs:string" />
                        <xs:element name="Name" type="xs:string" />
                        <xs:element name="Version" type="xs:string" />
                        <xs:element name="Description" type="xs:string" />
                        <xs:element name="Author" type="xs:string" />
                        <xs:element name="Icon" type="xs:string" />
                        <xs:element name="HelpUri" type="xs:string" />
                        <xs:element name="Languages">
                            <xs:complexType>
                                <xs:attribute name="L1" type="xs:string" use="required" />
                                <xs:attribute name="L2" type="xs:string" use="required" />
                            </xs:complexType>
                        </xs:element>
                    </xs:sequence>
                </xs:complexType>
            </xs:element>
            <xs:element name="WhenRun">
                <xs:complexType>
                    <xs:sequence>
                        <xs:element name="LangMode" type="xs:string" />
                        <xs:element name="CharCountMin" type="xs:unsignedByte" />
                        <xs:element name="ResponseWait" type="xs:unsignedShort" />
                        <xs:element name="ScenarioTypes" type="xs:string" />
                    </xs:sequence>
                </xs:complexType>
            </xs:element>
            <xs:element name="LikelihoodQuickCheck">
                <xs:complexType>
                    <xs:sequence>
                        <xs:element maxOccurs="unbounded" name="InputMatch">
                            <xs:complexType>
                                <xs:attribute name="score" type="xs:unsignedByte" use="required" />
                                <xs:attribute name="lexiconTag" type="xs:string" use="optional" />
                                <xs:attribute name="regex" type="xs:string" use="optional" />
                            </xs:complexType>
                        </xs:element>
                        <xs:element name="ContextMatch">
                            <xs:complexType>
                                <xs:attribute name="score" type="xs:unsignedByte" use="required" />
                                <xs:attribute name="regex" type="xs:string" use="required" />
                            </xs:complexType>
                        </xs:element>
                    </xs:sequence>
                </xs:complexType>
            </xs:element>
            <xs:element name="Engine">
                <xs:complexType>
                    <xs:sequence minOccurs="0">
                        <xs:element maxOccurs="unbounded" name="RegisterLocalEngineEvent">
                            <xs:complexType>
                                <xs:attribute name="name" type="xs:string" use="required" />
                                <xs:attribute name="callback" type="xs:string" use="required" />
                            </xs:complexType>
                        </xs:element>
                        <xs:element name="AllowLocalEngineStorage">
                            <xs:complexType>
                                <xs:attribute    name="maxSizeKb"    type="xs:unsignedShort" use="required" />
                            </xs:complexType>
                        </xs:element>
                        <xs:element                                        maxOccurs="unbounded" name="AllowLocalEngineWebService">
                            <xs:complexType>
                                <xs:attribute name="uri" type="xs:string" use="required" />
                                <xs:attribute    name="maxTimesPerDay"    type="xs:unsignedByte" use="required" />
                            </xs:complexType>
```

TABLE 1-continued

Example Manifest Schema Implementation

```
                </xs:element>
            </xs:sequence>
            <xs:attribute name="provider" type="xs:string" use="required" />
        </xs:complexType>
    </xs:element>
    <xs:element name="Display">
        <xs:complexType>
            <xs:attribute name="target" type="xs:string" use="required" />
            <xs:attribute name="xslt" type="xs:string" use="required" />
            <xs:attribute name="homeUri" type="xs:string" use="required" />
        </xs:complexType>
    </xs:element>
    <xs:element name="Tooltip">
        <xs:complexType>
            <xs:attribute name="provider" type="xs:string" use="required" />
            <xs:attribute name="xslt" type="xs:string" use="required" />
        </xs:complexType>
    </xs:element>
    <xs:element name="Insertion">
        <xs:complexType>
            <xs:sequence>
                <xs:element maxOccurs="unbounded" name="Scenario">
                    <xs:complexType>
                        <xs:attribute name="name" type="xs:string" use="required" />
                        <xs:attribute name="xslt" type="xs:string" use="required" />
                    </xs:complexType>
                </xs:element>
            </xs:sequence>
            <xs:attribute name="defaultXslt" type="xs:string" use="required" />
        </xs:complexType>
    </xs:element>
    <xs:element name="CustomScript">
        <xs:complexType>
            <xs:attribute name="script" type="xs:string" use="required" />
            <xs:attribute name="callback" type="xs:string" use="required" />
        </xs:complexType>
    </xs:element>
        </xs:sequence>
    </xs:complexType>
</xs:element>
</xs:schema>
```

Based on the manifest schema, a manifest for an example map application is shown below in Table 2. The example map application is capable to provide and present a map as a rich candidate. Table 2 shows that the manifest follows the template and specification in the manifest schema and provides detailed attribute data of different elements for the particular map application.

TABLE 2

Manifest for Example Map Application

```
<?xml version="1.0" encoding="utf-8"?>
<ImeExtension
xmlns="http://schemas.microsoft.com/ime/extensions/1.0">
    <Identity>
        <Uid>{F5EC7721-3614-4CD4-8370-979166CB4CDC}</Uid>
        <Name>Bing Maps</Name>
        <Version>1.0.0.2</Version>
        <Languages L1="zh-CN" L2="en-US"/>
    </Identity>
    <WhenRun>
        <LangMode>zh-CN</LangMode>
<CharCountMin>2</CharCountMin>
        <ResponseWait>1500</ResponseWait>
        <ScenarioTypes>Chat|Email </ScenarioTypes>
    </WhenRun>
    <LikelihoodQuickCheck>
        <InputMatch score="90" lexiconTag="place"/>
        <InputMatch score="80" regex="road"/>
        <ContextMatch score="66" regex="there|at"/>
    </LikelihoodQuickCheck>
```

TABLE 2-continued

Manifest for Example Map Application

```
    <QueryAugmentation>
        <Context length="15"/>
        <TextCandidates length="3"/>
    </QueryAugmentation>
    <Engine target="Remote"/>
    <Display target="RichWindow" xslt="metro.xsl"/>
    <Insertion defaultXslt="default_plaintxt_insert.xsl">
        <Scenario           name="MESSENGER_CHATBOX*"
xslt="Messenger_chatbox_insert.xsl"/>
        <Scenario name="DEFAULT_HTML"
            xslt="default_html_insert.xsl"/>
    </Insertion>
</ImeExtension>
```

The IME may also provide a mechanism through which the associated applications may fully leverage functionality provided by the IME and may even modify the IME. The IME access control element 426, as shown in FIG. 4, is typically used by the developer for a group such as an enterprise, which needs additional augmentation of the IME. For example, an IT administrator may modify the IME to meet needs of a group of persons or policies of the enterprise and deploy the modified IME within the group.

The CustomScript element in Table 1 and Table 2 is a specific instance of the IME access control element 426. For example, the CustomScript element in the manifest declares lower level scripting capability for a respective application.

For example, because the CustomScript element can be called to modify any part of the IME, only one application with enabled CustomScript functionalities may be loaded at any time, as two applications both with enabled CustomScript functions running may conflict with each other and compete for resources.

The CustomScript element provides a powerful technique for leveraging the functionalities of the IME but also raises a security concern. Thus, when the respective application is installed, the computing system may also warn and alert the user that the application requires special permission. In addition, the user may have to be identified as having privilege to install the application whose manifest has the CustomScript element. For example, the user may be prompted to agree to the installation in an administrator mode instead of as a guest under the Microsoft Windows® operating system.

To define a CustomScript, the elements required are Identity and CustomScript in the manifest. For example, the CustomScript may point to a Jscript file in the CustomScript folder of the application package and a callback string to point to the main function of the script. Table 3 illustrates an example manifest for IME access control including the CustomScript element.

TABLE 3

Example Manifest for IME Access Control

```
<?xml version="1.0" encoding="utf-8"?>
<ImeExtension
xmlns="http://schemas.microsoft.com/ime/extensions/1.0">
    <Identity>
<Uid>{35C4CEC1-895E-4141-B7A1-D943C2921E96}</Uid>
<Name>Contoso IT Customized IME</Name>
<Version>1.0.0.3</Version>
<Description>Optimized IME for the enterprise at Contoso
corp.</Description>
<Author>Contoso Corporation</Author>
<Icon>icon.png</Icon>
<HelpUri>http://sharepoint/itgroup/ime/corp_customized</HelpUri>
    </Identity>
    <CustomScript script="contosoime.js" callback="contosoinit"/>
</ImeExtension>
```

In an example implementation, the script-enabled IME based on the IME access control element 426, may be built on Object Linking and Embedding (OLE) Automation ("Automation") technology when used in the Microsoft Windows® operating system. Automation is based on Component Object Model ("COM") and is an inter-process communication technology that enables one application to gain access to the exposed functionality of another. In the scenario of the example implementation, one application could have a CustomScript and the other application is the IME with core components, which the script needs access to. To enable the communication between IME components that, for example, may be written in C++ and JScript language, the IME components may implement an IDispatch interface. Considering the interoperation between C++ and JScript language involves argument checking, error handling etc., the computing system may implement a dependent class to act as a proxy between the IME core component and the script language. An example flow is as follows: (1) an end-user starts the IME; (2) the IME initializes the script host; (3) the script host loads and parses the Jscript file; and (4) the programming logic of the Jscript file does not directly access the IME core components, but rather a proxy layer. A user uses IME and the IME core initializes the script host, which loads and parses the JS file, and the JS file manipulates the IME core through a script host by ImeRoot, which acts as the proxy. Through this proxy, major functions of the IME are exposed. The script is an interpreted language so "script host" is needed to parse and run the script and the script operates the IME through the script host.

Figure 5:
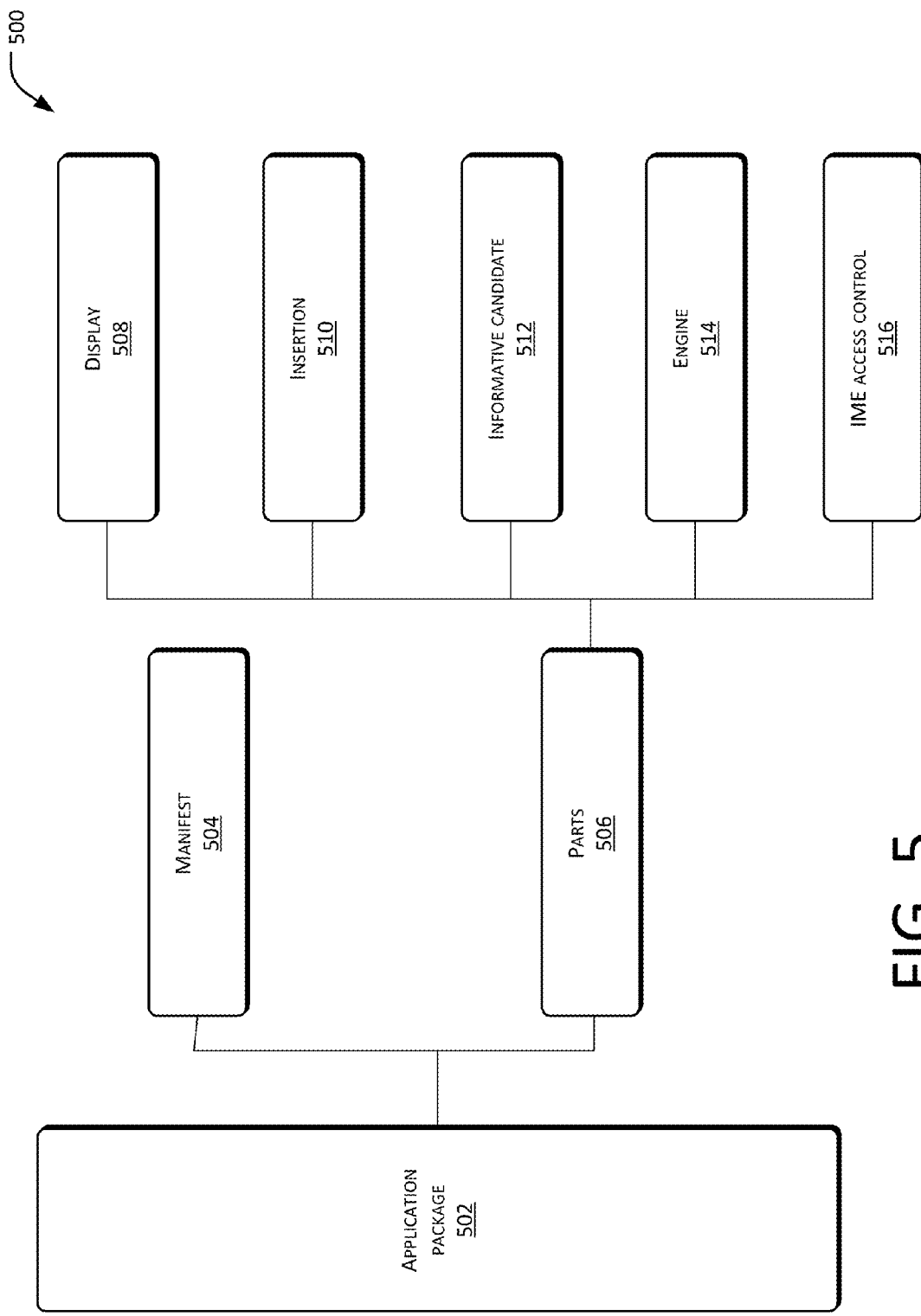
FIG. 5 illustrates an example application package format of a particular application to be installed at the client device and/or the server of the computing system of the IME

FIG. 5 illustrates an example application package format 500 of a particular application to be installed at the client device and/or the server of the computing system of the IME. An application package 502 includes a manifest 504 and one or more parts 506. The manifest 504, as shown above, may be in a form of declarative markup language such as XML to serve as a self describing file. The parts 506 may include one or more sub-folders under the application package 502. Each sub-folder may correspond to an element stated in the manifest 504. In the example of FIG. 5, the parts 506 include a display sub-folder 508, an insertion sub-folder 510, an informative candidate sub-folder 512, an engine sub-folder 514, and an IME access control sub-folder 516.

The application package format 500 may be based on open standards and can therefore be examined on any operating system and without special interpretation by any particular product. The application package format 500 may use zip packaging (zlib) and XML formats. The additional parts 506 map semantically to the runtime states described above, and may also contain open format files, such as HTML, CSS, Jscript, Png, XSLT, etc.

For example, the sub-folders of the parts 506 may be optional as they are only required if they are referenced in the manifest 504. Binary files (excluding .png, .gif, .jpg) such as .dll and lexicon binaries are typically only allowed in the engine sub-folder 514. In one example, only files may be added to the application package 502, except for the parts 506. The intention of restricting what can be added is to make the package format 500 more efficient, reliable, and secure. The package format 500 is efficient as the format is as flat as possible and so sub-paths do not need to be enumerated or searched. The format is reliable as the format strives to avoid as much as possible unnecessary complexity which often carries bugs. The format is secure as potentially malicious or otherwise hidden payload cannot be buried within a folder hierarchy.

Both the client component and the server component of a respective application may have the same or similar packaging formats. For example, an example naming convention is [publisher].[appname].v[version].app, such as Contoso.maps.v1.0.0.6.client.app that is used for the name of the client component of the respective application and Contoso.maps.v1.0.0.6.server.app. Contoso is the name of a publisher. Maps is the name of the application. 1.0.0.6 is the version number.

As shown above, the manifest file in the form of declarative markup language to describe the application behavior improves efficiency, maintainability, reliability, extensibility, and security. For efficiency purposes, the manifest file is loaded into memory by de-serializing into an efficient data structure using native code objects. Alternatively, a script using scripting language may be used to describe the behaviors of the application. As the script needs to run with high frequency, potentially on every keystroke, and there could be N scripts if there are N applications installed, where N may be any integer. In short, the manifest file enables scaling of multiple applications.

Maintainability is achieved as the declarative language, such as XML, is human readable and the behavior is implied by the self-description. Reliability is achieved by leveraging schema enforcement of format. Extensibility may be achieved by leveraging the built-in versioning functionality via the XML namespace, for example. Security is in part achieved because markup is itself not executed, it is in clear text and easily scannable. Conversely, a binary or scripting solution would be executing code itself. Additionally, since the manifest file is a declaration, the user can see what system capability or unique behavior is "requested" by the application. For example, an application that requires local storage capability would be clearly presentable to the user at install time when the user selects to install the application, thereby giving the user the opportunity to reject it if the user feels the application may cause security concerns.

Figure 6:
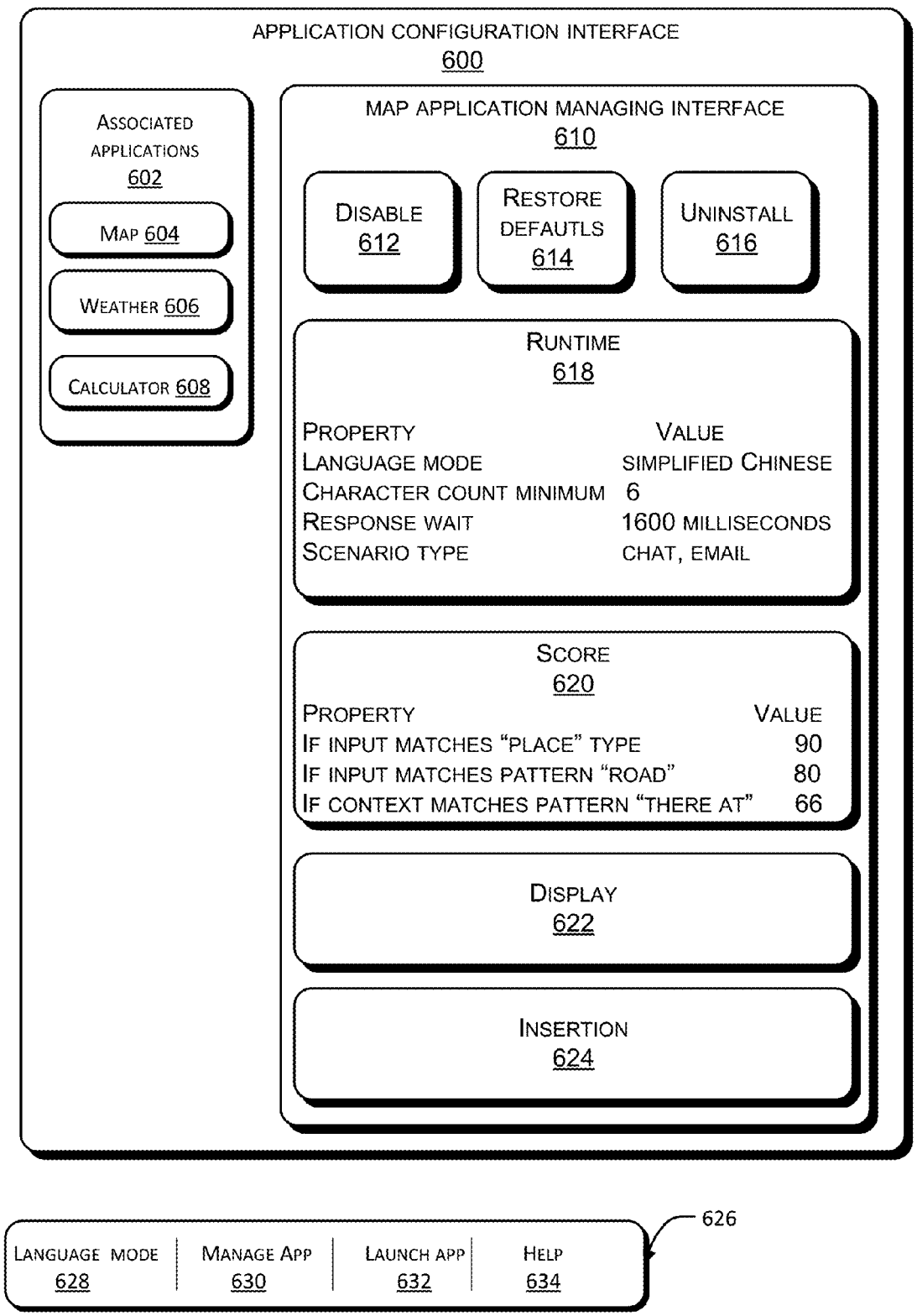
FIG. 6 illustrates an example application configuration interface that manages the applications associated with the IME.

FIG. 6 illustrates an example application configuration interface 600 for a user to manage the applications associated with an input method editor (IME). The application configuration interface 600 may be automatically generated based on the manifest schema and/or manifests of the associated applications. In the example of FIG. 6, the left side of the application configuration interface 600 lists one or more associated applications 602 that are already associated with the IME. The associated applications 602 may include a map application 604, a weather application 606, and a calculator application 608. When a user clicks a particular application button, such as the map application 604, the right side of the application configuration interface 600 appears and lists an interface to manage the particular application, e.g., a map application managing interface 610 in FIG. 6.

Each application managing interface, such as the map application interface 610, includes one or more basic function buttons to help the user configure the functionalities of the particular application. In the example of FIG. 6, the one or more buttons include a disable button 612, a restore defaults button 614, and an uninstall button 616. If the user selects the disable button 612, the map application 604 will not be activated or selected to provide candidates. If the user selects the restore defaults button 614, default settings of the map application 604 are applied and the default settings overwrite any previous modifications made by the user or through a machine-learning process. If the user selects the uninstall button 616, the map application 604 will be uninstalled from or unassociated with the IME.

The application configuration interface 600 may also provide more freedom to the user to adjust one or more characters of the particular application. In one example, some characteristics or attributes may be set unchangeable by the computing system or the user. In another example, all characteristics or attributes may be open to edit through machine learning or by the user. In the example of FIG. 6, the map application managing interface 610 also provides advanced options for the user to manage different characteristics of the map application 604 based on the manifest schema and/or the manifest for the map application 604. For advanced options, the user may modify most behaviors of the map application 604, from when it runs, to how it displays. If any defaults are changed by the user, a new copy of the manifest file of the map application 604 is created and is used as a current one. The old copy may be stored so that if the user wishes, the user can restore the default setting which simply swaps the old copy of the manifest for the modified manifest. In this way, the manifest file also serves as a configuration storage medium.

In the example of FIG. 6, the map application managing interface 610 includes a runtime window 618 that lists one or more characteristics or attributes of the map application 604 at the runtime state. For example, the runtime window 618 displays various properties and corresponding values associated with the map application 604 at the runtime state. For instance, the language mode is simplified Chinese, the character count minimum is 6, the response waiting time is 1600 milliseconds, and the scenario types are chatting and emailing. The scenario type property means that the map application 604 is qualified to run when the scenario of the host application matches the values of the scenario type property, i.e., chatting or emailing. For example, the scenario type property and its values may be generated based on the running qualification element of the manifest of the map application. More specifically, the scenario type property and its values can be generated based on the "When Run" element in the Table 2 Manifest for Example Map Application.

The user may edit these properties and values, such as adding or deleting one or more scenarios in which the map application 604 is qualified to run. For example, the user may add another scenario such as "document" in the values of the scenario type property. Based on this change, when the host application is a document application, such as Microsoft Word®, the map application 604 is also qualified to run.

The score window 620 lists different scores of the map application 604 for different parameter combinations. In the example of FIG. 6, if the input matches a "place" type, the corresponding score is 90. If the input matches a pattern "road", the corresponding score is 80. If the context matches a pattern "there at," the corresponding score is 66. The user may edit the scores or add more self-defined combinations of parameters and corresponding scores in the score window 620. The properties and values may also be automatically modified by machine-learning.

The display window 622 may list various properties and values of the map application 604 at the display state, such as the type of candidate the map application 604 supports and whether to present the candidate at an interface separate from that of the IME.

The insertion window 624 may list various properties and values of the map application 604 at the insertion state, such as a format of the candidate to be inserted into the host application. The application configuration interface 600 may be part of the IME and can be launched from an IME bar window 626 of the IME. The IME bar window 626 may include a plurality of buttons for different functions of the IME such as a language mode button 628, a manage application button 630, a launch application button 632, and a help button 634. The user can select the language mode button 628 to set the language mode, e.g., English or simplified Chinese, for the candidates. The user can select the manage application button 630 to launch the application configuration interface 600. If the user selects the launch application button 632, a list of associated applications will be presented to the user to select to launch, which is described in detail below. The help button 634, when selected by the user, provides some helpful information such as questions and answers to the user. The IME bar window 626 in FIG. 6 is just an example. In different examples, the IME may have different IME bar windows with different appearance styles and function buttons.

Example Method for Selection of Application

Figure 7:
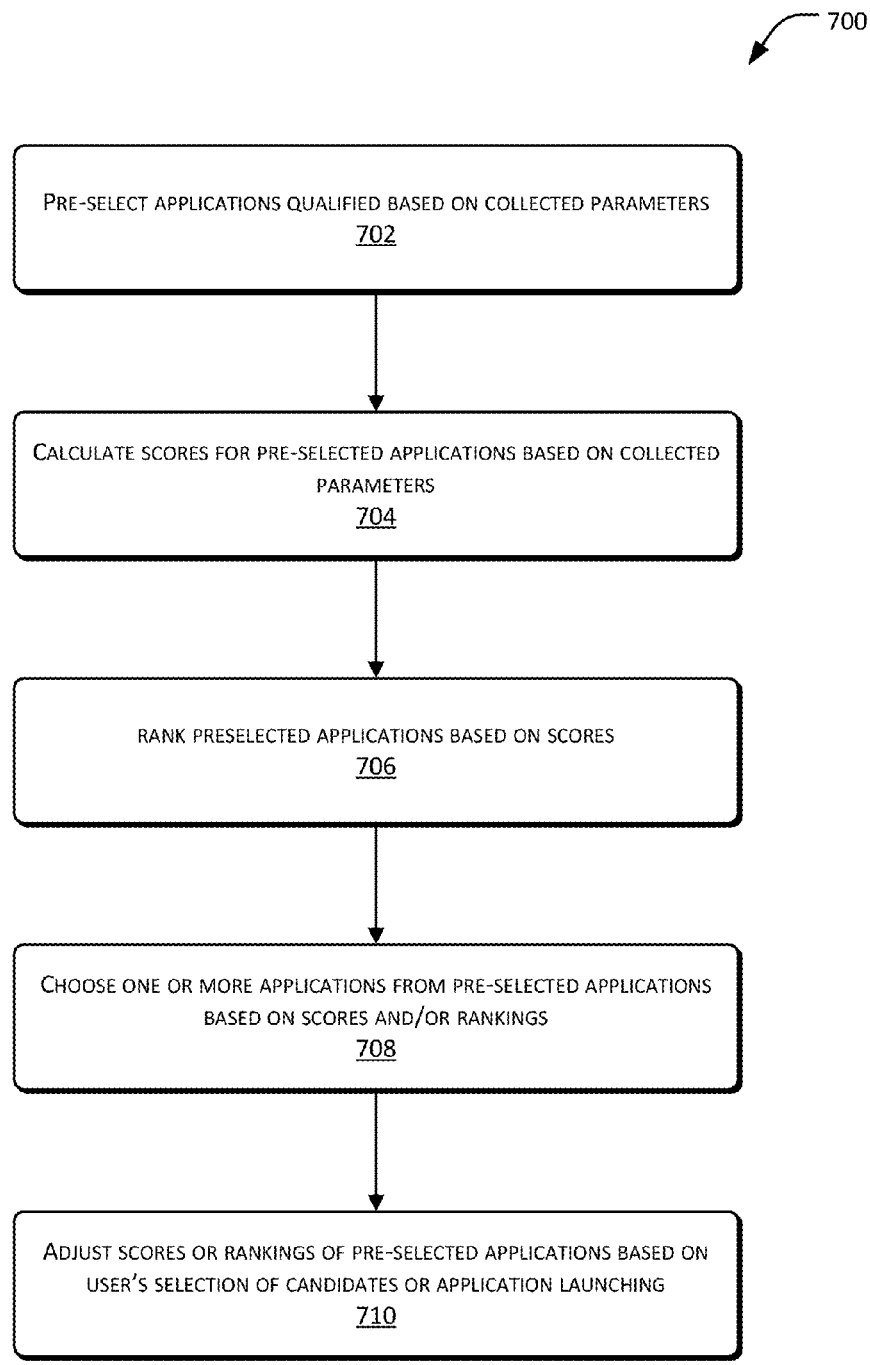
FIG. 7 illustrates a flowchart for an example method for selecting an application from multiple applications associated with the IME.

FIG. 7 illustrates a flowchart for an example method 700 for selecting an application from multiple applications associated with the IME.

At 702, the IME screens multiple applications associated with the IME to pre-select one or more applications that are qualified to run based on one or more collected parameters. For example, the IME collects the query input by the user, the scenario of the host application, such as the application name, and the context, such as previously written characters retained by the host application in memory which may be cleared frequently.

For example, the IME may load manifests of all associated applications into the memory of the computing system of the client device and check their running qualification elements in their manifests. If the scenario of the host application is listed as a value in the qualification element of the manifest of a particular application, such particular application is qualified to run and is pre-selected.

At 704, the IME calculates a score for each pre-selected application based on the one or more collected parameters. The one or more parameters, for example, may include the query input by the user, the scenario of the user input such as the scenario of the host application, a context of the user input, and/or a language mode. In one example, the IME 106 may calculate the scores in real-time based on a plurality of preset rules. In another example as shown in FIG. 6, scores of the respective applications under various combinations of parameters may be pre-calculated and stored in its manifest. The IME may select a stored combination of parameters of the respective application that matches or is mostly relevant to the current collected parameters, and use the pre-calculated score. For example, for a respective pre-selected application, the selection probability element in its manifest is checked and a score is obtained based on a stored score whose corresponding combination of parameters is the same as or most similar to the currently collected parameters.

At 706, the IME 106 ranks the pre-selected applications based on their scores. At 708, the IME 106 chooses one or more pre-selected applications from the pre-selected applications based on their rankings and/or scores. For example, the IME 106 may choose the one or more pre-selected applications whose scores are higher than a preset score threshold or whose rankings are higher than a preset ranking threshold. Alternatively, the IME 106 may take into account both the score and the ranking. For example, the IME may not choose a pre-selected application if its score is lower than the preset score threshold even if its ranking is higher than a preset ranking threshold.

At 710, the IME adjusts scores or rankings of one or more pre-selected applications based on a selection of a candidate or an application launched by the user. For example, after the IME chooses one or more applications to provide candidates to the user, the user may select a candidate generated by a particular application. The user may also directly launch an application as shown in FIG. 1. The IME will adjust the score of the chosen application accordingly, such as increasing the score or ranking of the particular application selected by the user under the currently collected parameters, or reducing the score or ranking of another application whose candidates are not chosen by the user. In one example, such machine learning is based on the preference of the particular user that selects or launches different applications based on different combination of parameters in a period of time. In another example, such machine learning may further take into the preference of other user such as the applications selected or launched by other users in a same or similar combination of parameters.

The IME may use machine-learning techniques to automatically implement the adjusting. The IME will use the adjusted values and properties to update the manifests of the corresponding applications and the user may view such changes or further edit the changes through the application configuration interface as shown in FIG. 6.

In the example of FIG. 1, the user 102 launches another application, such as the weather application 130, to provide candidates based on the same or similar query. The IME 106 may increase the score of the weather application 130 and choose it at a future time when facing same or similar collected parameters. Further, the IME 106 may collect different users' selection preferences anonymously, without referencing personal data of the users, under different parameters to calculate and improve the scores and ranking of the applications under different scenarios.

Example Informative Candidate Scenario

Figure 8:
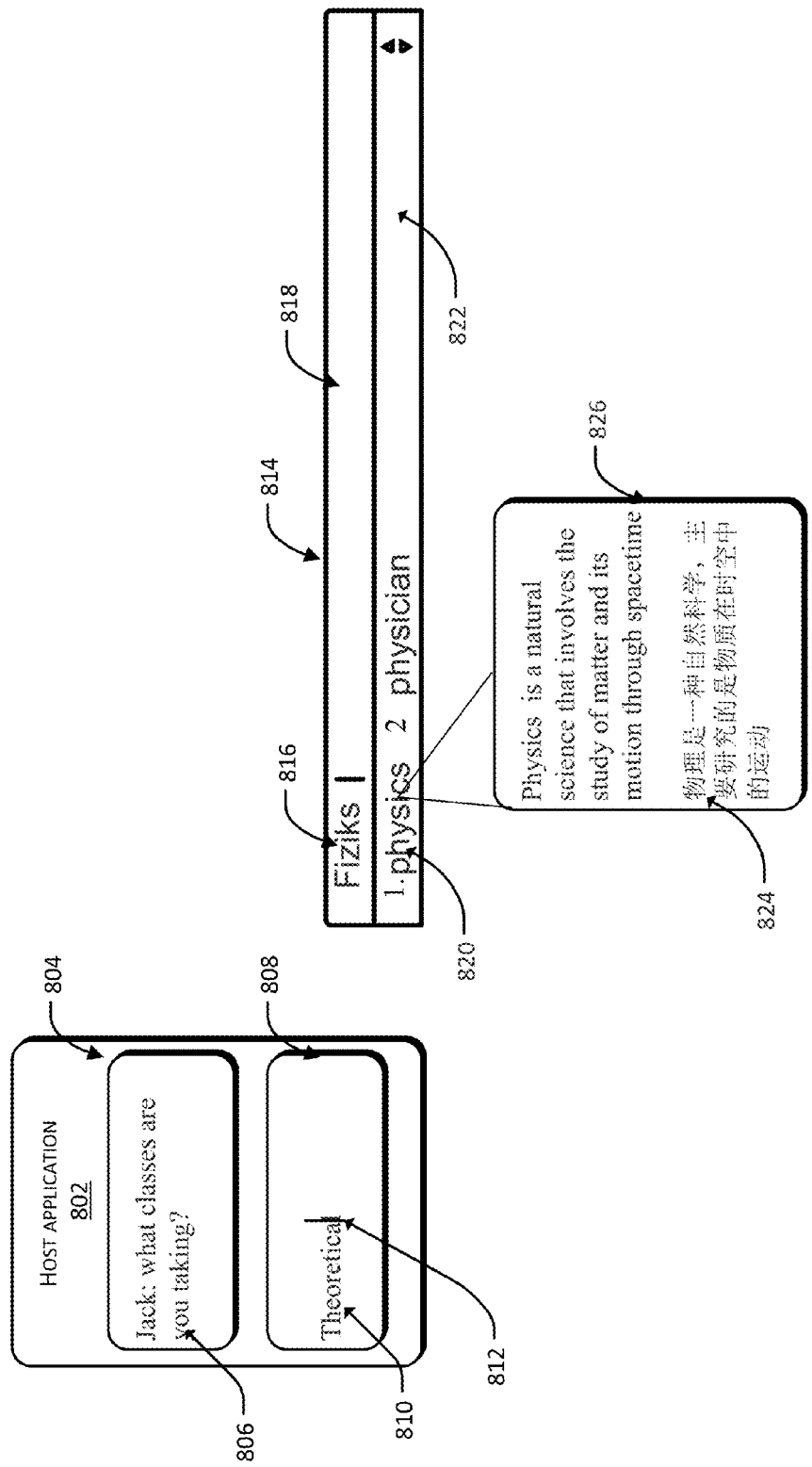
FIG. 8 illustrates an example scenario to provide an informative candidate to the user.

FIG. 1 illustrates that the informative candidate 140 is provided to the user 102 when the user 102 points to the rich candidate 138. FIG. 8 illustrates another example scenario to provide an informative candidate to a user.

In the example of FIG. 8, the host application 802 is a chatting application such as Microsoft MSN®. A chatting window 804 of the host application displays the objects 806 which are already input into the user interface of the host application 802. The objects 806 include "Jack: What classes are you taking?"

The input window 808 displays one or more input objects 810 that are to be input into the chatting window 804 as the objects 806. The input objects 810 include text object "theoretical." An input indication 812, represented by "|," represents an indication of a place to insert the next input object 810.

User interface 814 of an IME enables a user to select and input one or more candidates into the input window 808 of the host application 802. In the example of FIG. 8, the user inputs a query 816 "Fiziks" into a composition window 818 of the user interface 814 of the IME. After collecting and analyzing one or more parameters, such as the context reflected by the objects 806, input objects 810, and previous use history, the IME may determine that the query 816 "Fiziks" represents an abbreviation of "physics" and display "physics" as a first text candidate among text candidates 820 in a text candidate window 822. The IME may also display a second text candidate, "physician," and any number of other text candidates (not shown in FIG. 8) as the text candidates 820 at the text candidate window 822.

If the user wants to learn more information of the text candidate 820 "physics," the user may use any input techniques such as a mouse to hover over the text candidate 820 or press a key at a keyboard to activate the functionality of the IME to provide informative candidates. The IME, after receiving the indication from the user, checks whether there is a corresponding informative candidate 824 of the text candidate "physics" and displays the informative candidate 824, if any, at the informative candidate window 826. In the example of FIG. 8, the informative candidates 824 include a definition of "physics" in both English and Chinese. The informative candidates 824 include "Physics is a natural science that involves the study of matter and its motion through spacetime" and "三里屯 一种自然科学，主要研究的是物质在时空中的运动，" which is a simplified Chinese definition of physics.

In the example of FIG. 8, the informative candidate window 826 may be an HTML-based information window. The informative candidate window 826 may appear only when the IME determines that there is a corresponding informative candidate 824.

In one example, the application that provides the respective candidate, i.e. the text candidates 820 in which the user shows interest, will have a priority in ranking to be selected as the application to provide the informative candidate. Thus the informative candidate is highly relevant to the respective candidate. In the example of FIG. 8, the text candidate 820 "physics" may be provided by the engine of the IME. The IME would search its own engine and then select one or more applications to provide the informative candidate.

The IME may also set a default application to provide informative candidates under different combinations of parameters. For example, when the text candidate selected by the user is a terminology, a default application such as a dictionary application or an encyclopedia application may be used to provide the informative candidates. Similarly, when the text candidate selected by the user is a stock name, a stock application may be used to provide stock information such as stock charts of the stock.

Example Stand-Alone Application

Figure 9:
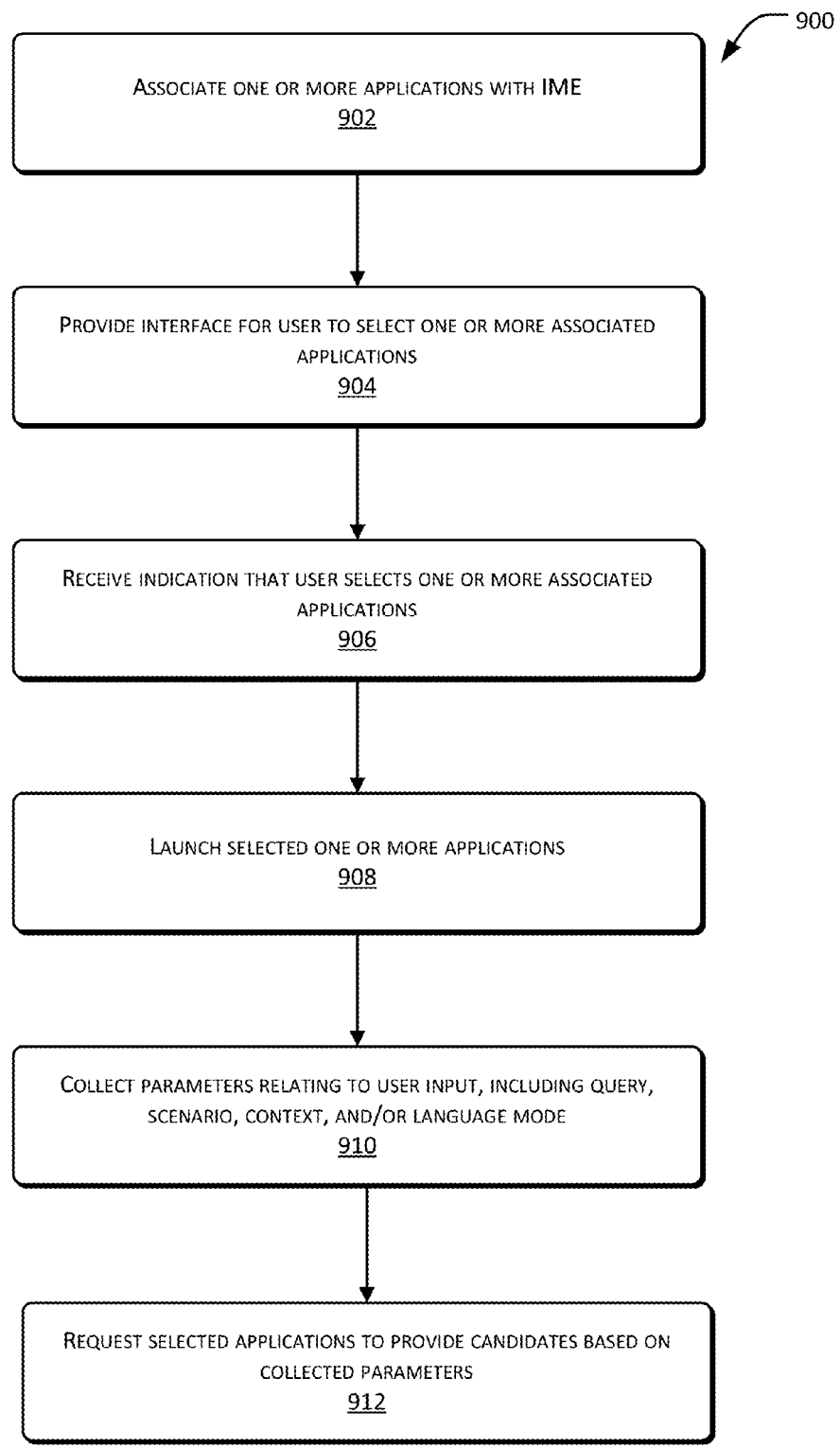
FIG. 9 illustrates a flowchart for an example method for launching an application in a stand-alone interface to provide candidates.

FIG. 9 illustrates a flowchart for an example method 900 for launching an application in a stand-alone interface to provide candidates. The stand-alone interface of the launched application may be independent and separate from the interface of the IME.

At 902, one or more applications are associated with an IME. At 904, the IME provides an interface for a user to directly select one or more of the associated applications. In one example, the interface may be the composition window 142 as shown in FIG. 1. The user may use special syntax, such as inputting a name or symbol of his/her desired application at the user interface of the IME such as the composition window 142. In another example, the interface may be at the IME bar window 626 as shown in FIG. 6, such as an interface triggered by clicking the launch application button 632.

The user may launch as many applications as he/she likes. In one example, the user interfaces may be decoupled from functionalities of the IME. The representation styles of the user interfaces, such as skins, of the launched applications may be different from each other and may be different from that of the IME. In another example, the skin of the IME may control the user interface of the launched applications such as via global Cascading Style Sheets (CSS) rules. It is appreciated that the developer of the application does not need to worry about creating the interface of the independently launched application. Rather, the application interface can be generated automatically without requiring the application developer to write user interface source code. For example, the stand-alone interface of the application may be generated based on the manifest and/or the CSS rules. For another example, the stand-alone interface of the application may be selected by the user from a plurality of available interfaces such as skins presented to the user.

At 906, the user selects one or more applications from the user interface by using any inputting techniques, and the IME receives an indication of such selection. Based on the selection of the respective application, the IME will bypass calculation of the scores and rankings of the associated applications as shown in FIG. 4, and the IME will directly query the particular engine of the selected application.

At 908, the IME launches the selected one or more applications. In one example, the applications may be running in the background without presenting their standalone interfaces at the client device. The candidates provided by the applications are presented to the user through the user interface of the IME. In another example, the launched application may have its independent standalone interface independent and separate from that of the IME such as its own composition window to receive a query. For instance, a homepage or user interface of the application is rendered at the user interface of the client device. The display element in the manifest of the selected application, such as a sub-element for the stand-alone user interface attribute, will be called. If none is provided, a default stand-alone user interface or homepage will be displayed.

At 910, the IME collects multiple parameters relating to the user input. The one or more parameters include the query input by the user, the scenario of the user input such as the scenario of the host application, a context of the user input, and/or a language mode.

At 912, the IME requests the selected one or more applications to provide one or more candidates to the user at least partly based on one or more of the collected parameters. In an example implementation, a generated or identified rich candidate will load through an embedded web browser with a text field automatically placed above it. A selected candidate may be copied to a clipboard of the computing system and then pasted at the user interface of the host application as the user input.

Figure 10:
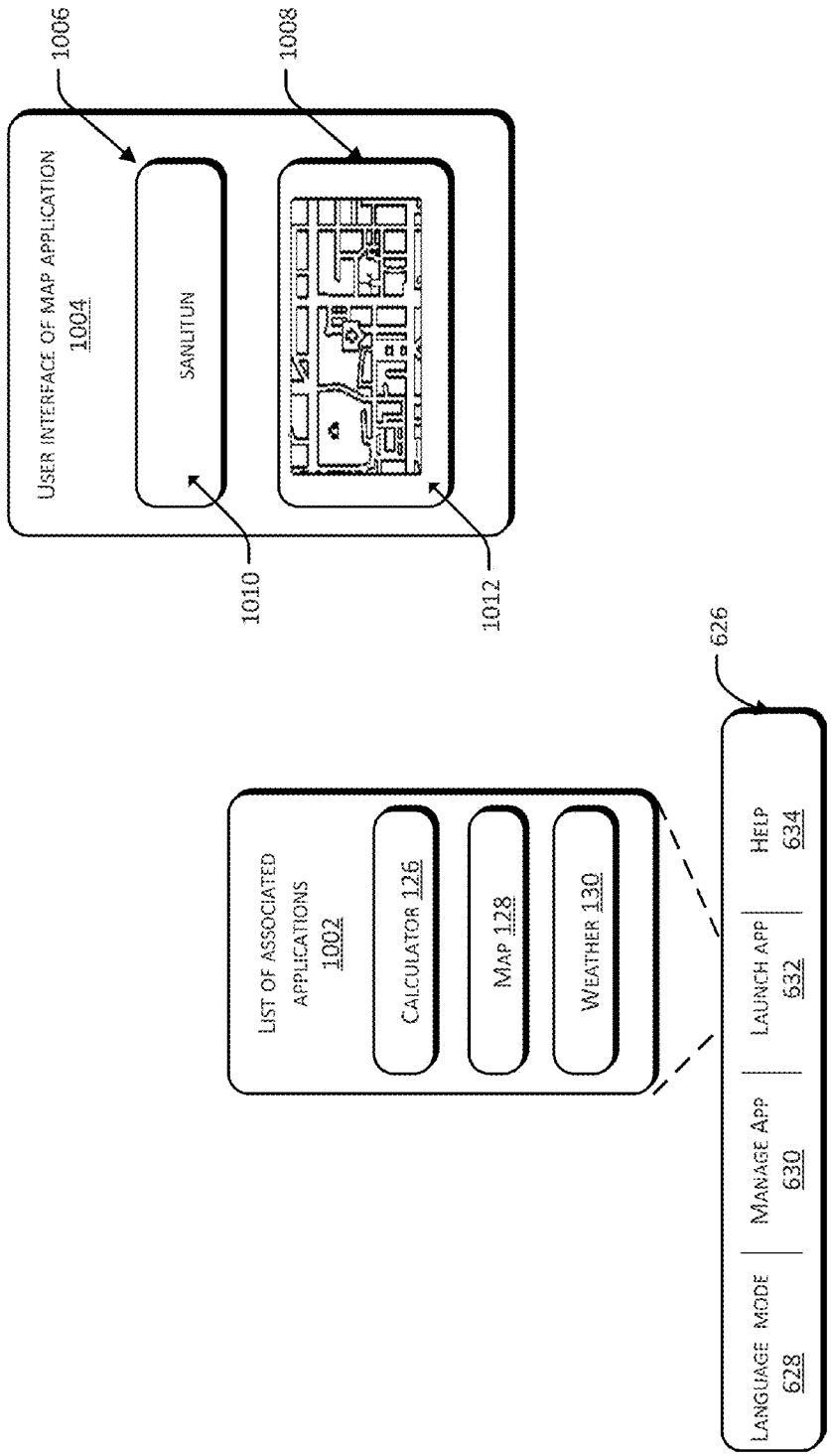
FIG. 10 illustrates a scenario of launching a map application in a stand-alone interface.

FIG. 1 illustrates that the map application 128 is selected by the IME 106 to provide candidates through the user interface 104 of the IME 106. In another example, FIG. 10 illustrates a scenario of launching an example application such as the map application 128 in a stand-alone interface separate from the user interface 104 of the IME 106. For example, the user 102 may click the launch application button 632 at the IME bar window 626 in FIG. 6. After receiving the indication from the user 102, the IME 106 presents an interface listing associated applications 1002 for the user 102 to select. The list of associated applications 1002 lists the applications associated with the IME 106, i.e., the calculator application 126, the map application 128, and the weather application 130. The user 102 may select the map application 128. After receiving the indication, the IME 106 launches the map application 128 in a stand-alone user interface of map application 1004. The user interface of map application 1004 may include a composition window 1006 to receive one or more queries and a candidate window 1008 to display generated or identified candidates. The user 102 may input a query 1010 such as "sanlitun" in the composition window 1006. The map application 128 receives the one or more parameters relating to user input, which may be collected by the IME 106, or collected jointly by the IME 106 and the map application 128, and generates or identifies the rich candidate 1012, which is a map of "sanlitun." The candidate 1012 is displayed in the candidate window 1008.

Example Insertion of Selected Candidate

After the candidates provided by the IME and/or the selected or launched applications are displayed at the user interface of the IME or the independent user interfaces of the applications, the user may select one or more of the candidates to insert into the user interface of the host application. The IME or the selected application may, based on the formats supported by the host application, form the selected candidates in an optimal format supported by the host application and insert such optimized selected candidate into the host application.

Figure 11:
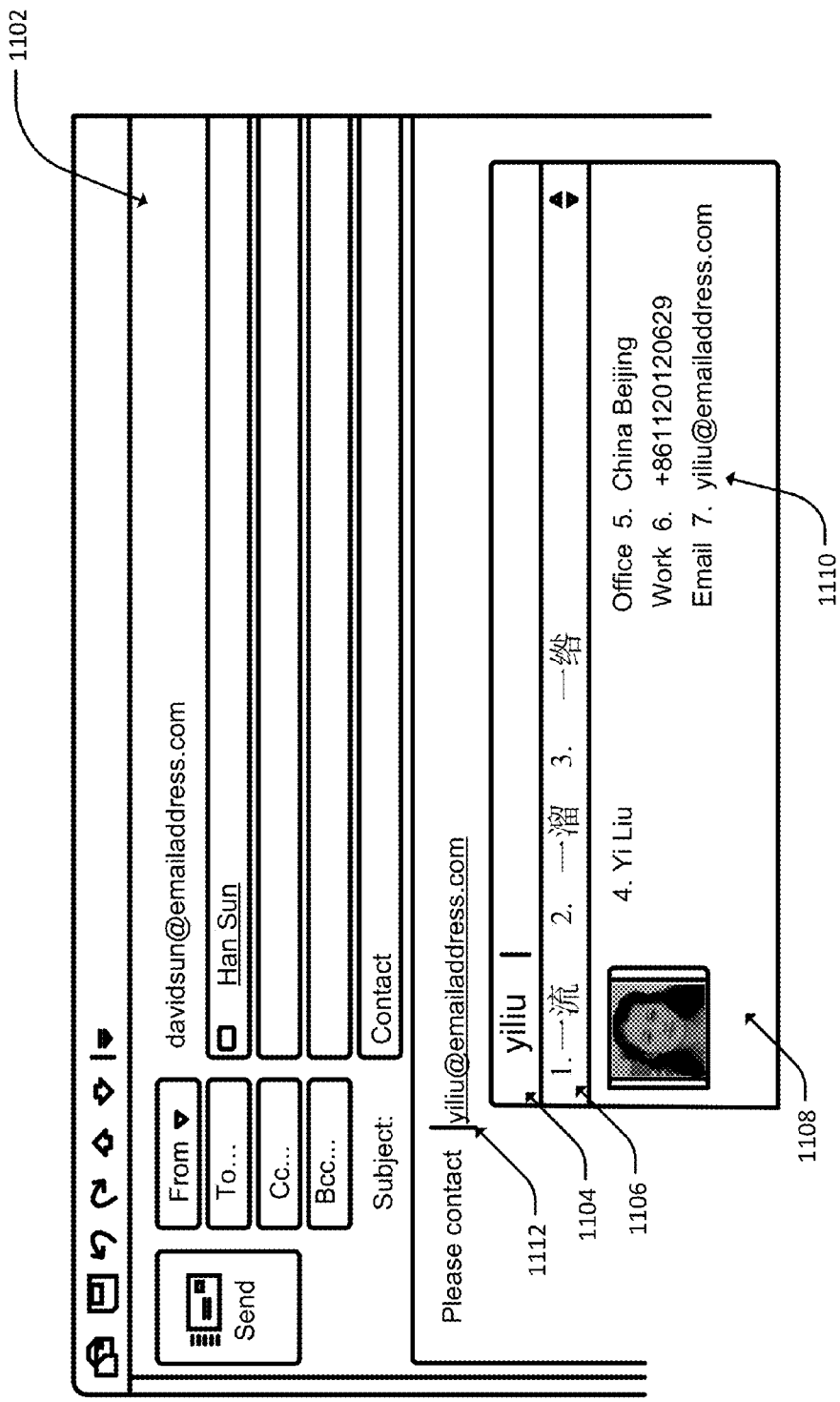
FIG. 11 illustrates a user interface for inserting candidates in an example email scenario.

FIG. 11 illustrates inserting candidates in an example email scenario. In the example of FIG. 11, the host application 1102 is an email application such as Microsoft Outlook®. When the user inputs the query 1104 "yiliu," the returned text candidates 1106 include three Chinese terms corresponding to the spelling of "yiliu." The rich candidates 1108 include detailed contact information of a person named "Yi Liu." The rich candidate may be provided by a mail application selected by the IME 106 for the scenario of mailing. The mail application may use an address book service, which may be available, for example, through a local mail service application such as Microsoft Outlook® or a remote address book service, such as Microsoft Exchange® server. The user selects a rich candidate 1110 from the rich candidates 1108. The rich candidate 1110 is an email address, "yiliu@emailaddress.com." The IME or the mail application determines that the host application 1102, which is an email application, supports the hyperlink in the email format and also determines that an email format of the rich candidate 1110 is an optimal format under the scenario of the host application 1102. For example, the user or a receiver (not shown in FIG. 11) of this email can directly click the rich candidate 1110 to launch another email in which yiliu@emailaddress.com is the recipient. Thus, after an input indication 1112 that indicates the location to insert the selected candidate, the selected rich candidate 1110 will be inserted in an email format.

Figure 12:
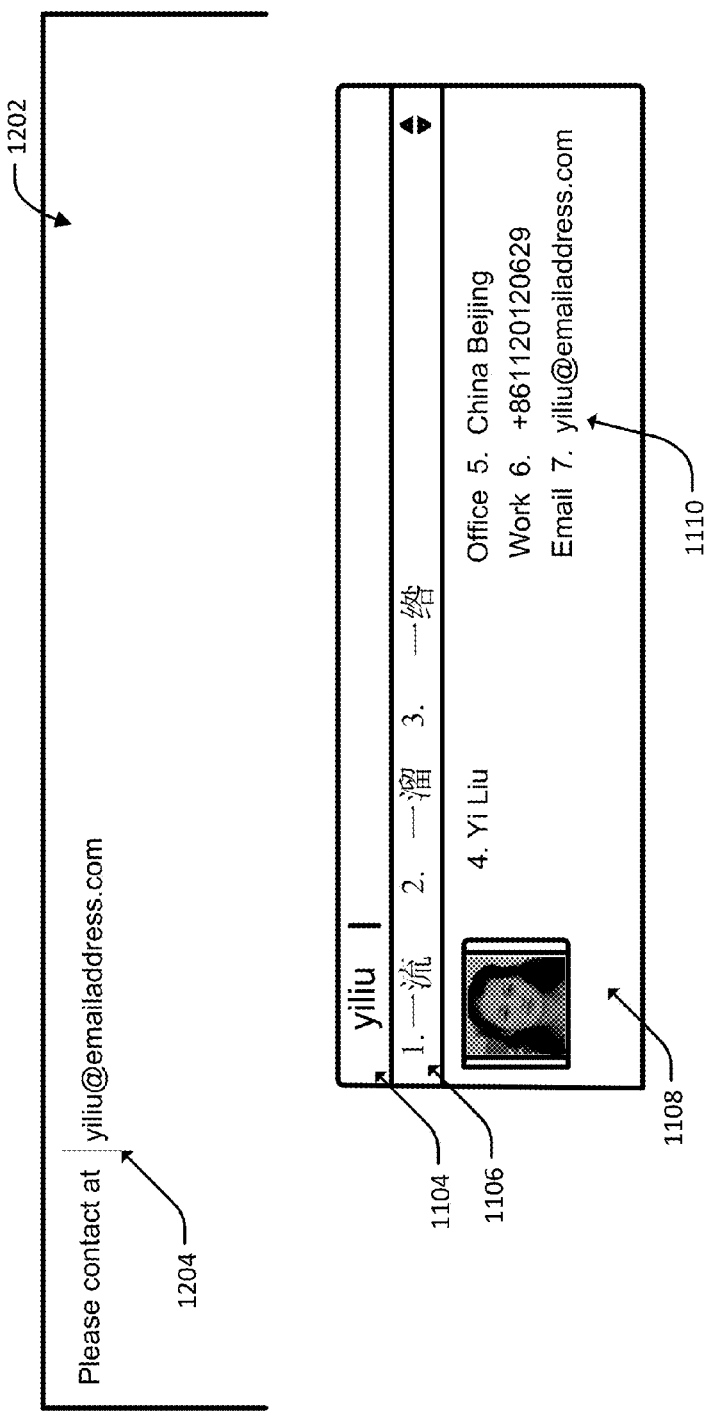
FIG. 12 illustrates a user interface for inserting candidates in an example document scenario.

FIG. 12 illustrates inserting candidates in an example document scenario. In the example of FIG. 12, the IME selects the mail application and provides the same text candidate 1106 and rich candidates 1108 based on the same query 1104 "yiliu" as shown in FIG. 11. Also as shown in FIG. 11, the user selects the rich candidate 1110 yiliu@emailaddress.com. However, the IME or the mail application may determine that a host application in the example of FIG. 12 is a Notepad® application, which only supports text format. Thus, after an input indication 1204 that indicates the location to insert the selected candidate, the IME 106 or the mail application may remove the hyperlink in the email format and convert the rich candidate 1110 from an email format to a simple text format.

An Exemplary Computing System for IME

Figure 13:
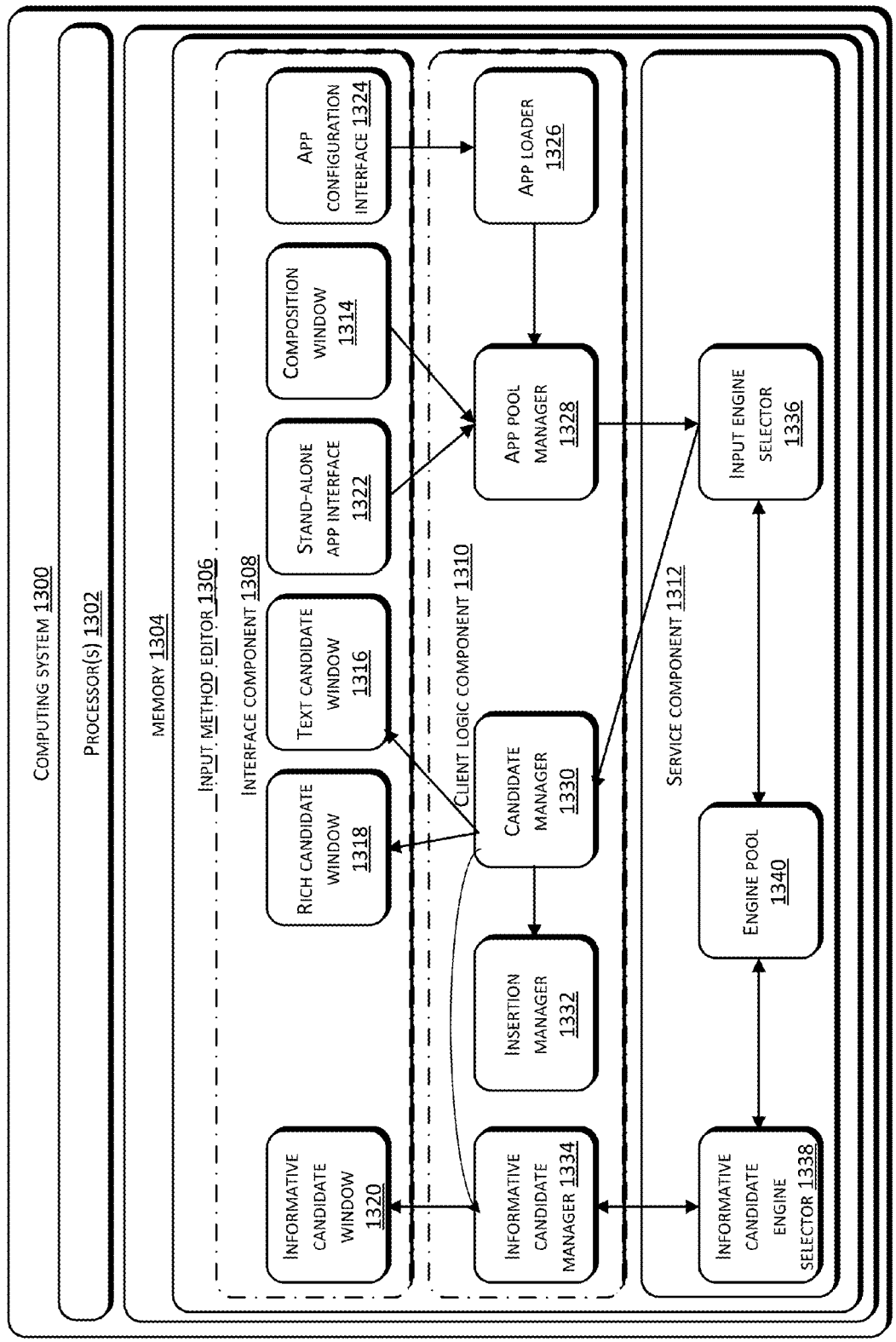
FIG. 13 illustrates selected components of an example computing system for the IME.

There may be various configurations of the IME. FIG. 13 illustrates an example computing system 1300 that implements the techniques of an example input method editor (IME) as described herein. The computing system 1300 includes one or more processors 1302 and memory 1304.

Memory 1304 may include volatile memory, non-volatile memory, removable memory, non-removable memory, and/or a combination of any of the foregoing. Generally, memory 1304 contains computer executable instructions that are accessible and executable by the one or more processors 1302. The memory 1304 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Any number of program modules, applications, or components can be stored in the memory 1304, including by way of example, an operating system, one or more computer applications such as the IME 1306, a chatting application, a document-editing application, a gaming application, an email application, other program modules, program data, and computer executable instructions or components. For brevity, the applications other than the IME application 1306 are not shown in FIG. 13. Any of the other computer applications may act as a host application that receives input from the user via the IME 1306.

The IME 1306 may include three tiers of components, i.e. an interface component 1308, a client logic component 1310, and a service component 1312. The interface component 1308 includes one or more user interfaces to interact with the user. The client logic component 1310 manages the user interfaces of the interface component 1308 and communicates with the service component 1312. For example, the client logic component 1310 collects one or more parameters relating to the user input, sends such parameters to the service component 1312 for further processing, receives returned candidates from the selected engines, and presents the candidates at the user interfaces of the interface component 1308. The service component 1312 selects one or more engines from the IME and/or multiple applications to provide candidates based on the collected parameters, and sends the generated or identified candidates to the client logic component 1310 that manages to display them at one or more user interfaces of the interface component 1308. The division of functionalities between the three components, particularly between the client logic component 1310 and the service component 1312 may be different in different computing systems.

The interface component 1308 may reside on a client device while the client logic component 1310 and/or the service component 1312 may reside at either the client device or one or more servers. In other words, the computing system 1300 may or may not be fully located at the client device. Alternatively, the computing system 1300 may use a client-server structure or a distributed system where more than one server may be utilized to implement the functionalities. The IME 1306 may be used in an environment or in a configuration of universal or specialized computer systems. Examples include a personal computer, a server computer, a handheld device, a portable device, a tablet device, a multi-processor system, a microprocessor-based system, a set-up box, a programmable customer electronic device, a network PC, and/or a distributed computing environment including any system or device above. In a distributed computing environment, a task is executed by remote processing devices which are connected through a communication network. In the distributed computing environment, the modules may be located in storage media (which include data storage devices) of local and remote computers.

The interface component 1308 may include a composition window 1314 that receives a query input by the user, a text candidate window 1316 that displays text candidates, a rich candidate window 1318 that displays rich candidates, and an informative candidate window 1320 that displays informative candidates. The interface component 1308 may also include a stand-alone application interface 1322 that is a user interface of an application directly selected and launched by the user. The interface component 1308 may also include an application configuration interface 1324 that enables the user to manage one or more characteristics of associated applications. The application configuration interface 600 in FIG. 6 is one example of an application configuration interface 1324. In one example, the interface component 1308 may provide a uniform presentation style, such as skins, to each of the interfaces. In another example, the IME and the applications may have their own presentation styles. For instance, the skin of the stand-alone application interface 1322 may be different for different applications and different from that of the IME.

The client logic component 1310 may include an application loader 1326, an application pool manager 1328, a candidate manager 1330, an insertion manager 1332, and an informative candidate manager 1334. The application loader 1326 installs application packages corresponding to associated applications and generates the application configuration interface 1324 based on manifests of the associated applications in the application packages. The application pool manager 1328 receives parameters from the interface component 1308 and characteristics of the applications from the application loader 1326 to provide an enhanced query to be further processed by the service component 1312. For example, the application pool manager 1328 receives the query input from the composition window 1314 and other parameters such as the scenarios and contexts from the interface component 1308. The application manger 1328 may also receive the identity of the particular application and the query input from the stand-alone application interface 1322. The characteristics from the application loader 1326, for example, may be in a de-serialized XML manifest format.

The candidate manager 1330 receives candidates provided from an input engine selector 1336 at the service component 1312 and manages the display of the provided candidates. For example, the candidate manager 1330 displays text candidates at the text candidate window 1316 and rich candidates at the rich candidate window 1318. The candidate manager 1330 may also receive an indication that the user is interested in learning information associated with a particular candidate at the rich candidate window 1318 or the text candidate window 1316 and passes such indication to the informative candidate manager 1334 to request a corresponding informative candidate if any. When the candidate manager 1330 receive a user's selection of a particular candidate from the rich candidate window 1318 or the text candidate window 1316, the candidate manager 1330 may send the selected candidate to the insertion manager 1332. For example, the selected candidate may be processed to be in the form of XML. The insertion manager 1332 inserts the selected candidate into the host application in a format, such as an optimal format, supported by the host application.

The informative candidate manager 1334 passes the indication that the user is interested in learning information associated with the particular candidate to an informative candidate engine selector 1338, receives one or more informative candidates corresponding to the particular candidate from the informative candidate engine selector 1338, and sends the informative candidates to the informative candidate window 1320 for display.

The service component 1312 may include the input engine selector 1336, the informative candidate engine selector 1338, and an engine pool 1340. The input engine selector 1336 receives the enhanced query from the application pool manager 1328 and selects one or more engines of the IME and the applications from the engine pool 1340. The input engine selector 1336 receives candidates provided by the selected applications from the engine pool 1340, and returns the provided candidates to the application pool manager 1328. The informative candidate engine selector 1338 may select the same engine that provides the particular candidate in which the user indicates interest and/or other engines from the engine pool 1340 to provide the informative candidates. The engine pool 1340 includes one or more engines of the IME and the applications that can be used to provide candidates. The one or more engines in the engine pool 1340 may be located at the client device, the server, or both.

For example, the common language of data between the interface component 1308, the client logic component 1310, and the service component 1312 may be XML, which represents the applications via manifests, the responses of the engines, and the candidate's representations in the display. The candidates may be transformed into either HTML or text format for display at the interface component 1308.

In an example implementation, data flow between the interface component 1308, the client logic component 1310, and the service component 1312 is described below in view of the example running states that include a query state, a service state, a display state, and an insertion state. It is appreciated that the data flow may be different in different examples.

In the query state, a user inputs a query at the composition window 1314 or the stand-alone application interface 1322. The following information is transmitted to the application pool manager 1328 in a scoring mechanism to pre-select qualifying applications for servicing:

---

User input (e.g., raw pinyin)
Scenario information (e.g., application name, input scope, etc.)
Context (e.g., previously written characters retained in memory in a particular application)

---

The output is an ordered list of applications, e.g., the "Contenders Vector," to be further selected by the input engine selector 1336 and served by the engine pool 1340. The applications in the pool are loaded into memory as objects from their original XML manifest representation for performance reasons so that they can be queried in real-time. For example, the manifest of the application, instead of all components of the application, needs to be loaded. By reference to FIG. 4, the application objects that meet the criteria listed in the running qualification element 412 of their respective manifests are considered in the scoring. For those qualified applications, the IME checks the selection probability element 414 of their respective manifests and calculates the score and/or ranking for each of the qualified applications. The highest N scoring or ranking applications beyond a threshold M are sent within a contender's vector to the server.

At the service state, the client logic component 1310, for example at a client device, identifies the engine pool 1340 and asynchronously sends the query, which may be dependent on the "engine" element in the manifest. The service component 1312, for example at a server, decides which engine to use. In other words, the client logic component 1310 submits a request and the service component 1312 decides which engine to use, if any. At the service component 1312, there is an interface, which is called IAppEngine herein, which each of the engines implements. Table 4 lists example functions of the IAppEngine interface.

TABLE 4

Example Functions of Engine Interface at Server

| Functions | Description |
|---|---|
| String ID ( ) | Returns the ID of the application that is present on the client. This links the client side portion of the application to the server side portion of the application. |
| Bool SupportsClient (version) | Given a version number of a client portion of an application, the server portion of the application will determine if it is compatible with the client portion of the application. It is assumed the server has the latest version of the application, so it is possible that the client side has not been updated and the application developer is no longer maintaining backward compatibility. In this case, the function returns false and the application will not be activated. |
| Double LikelihoodQuickCheck (input, scenario, context, optionalParams<n,v>) | Like the manifest, this function is used to quickly provide a probability that this particular engine should be used. It considers the input, scenario, and context information. This probability is a feature amongst numerous features that the server uses to determine which applications will be serviced |
| XML QueryCandidates (input, scenario, context) | Determines an underlying conversion service the engine uses and returns a response that will be read by the client. |
| XML QueryTooltip (candidateXML) | Determines an underlying information service for input candidates that the engine uses and returns a response that will be read by the client. |

If there are engines located at the local client device, such engines may also have a main.js file that has the same functions as above.

The enhanced query including multiple parameters to the engine pool 1340 may be as follows:

```
Q = {
Pinyin
Scenario
(Optional) Context
(Optional) TextCandidates
LocalContenders Vector:
    [{APPID, VER, CLIENT_SCORE }_0 ... {APPID, VER,
    CLIENT_SCORE }_n]
}
```

APPID represents an ID of a particular application. VER represents a version of the application. The CLIENT_SCORE represents a score of a particular application calculated by the client logic component 1310 of the IME 1306 from the query state as described above.

The input engine selector 1336 selects potential cloud engines at the server from the engine pool 1340. For example, the input engine selector 1336 considers engines that match the APPID values from the contender's vector, and pings each engine with the VER information (e.g., the IAppEngine interface exposes the SupportsClient function). For each engine E that is supported, the input engine selector 1336 adds it to ENGINE_CANDIDATES. The ENGINE_CANDIDATES represents the one or more engine candidates to be considered by the input engine selector 1336 to provide candidates.

For each engine in the ENGINE_CANDIDATES, the input engine selector 1336 calculates the E.SERVER_SCORE. The E.SERVER_SCORE represents a score of an engine candidate calculated by the server component 1312 of the IME 1306.

E.SERVER_SCORE = E.LikelyhoodQuickCheck(Q) // (exposed by IAppEngine)

The input engine selector 1336 calls a selection function to decide which engine to call. The selection function interface may be as follows:

- Input: ENGINE_CANDIDATES, N (How many to return)
- Output: EnginesN
- Example implementation - can adopt machine learning algorithms, such as Support Vector Machine (SVM):
  - FOREACH Engine E in ENGINE_CANDIDATES
    - RANKED_ENGINES[E]
      =NormalProbability(E.SERVER_SCORE) *
      NormalProbability(E.CLIENT_SCORE) *
      $Feature_1(E)$ * $Feature_2(E)$ ... $Feature_N(E)$
  - Sort(RANKED_ENGINES)
  - Return top N of RANKED_ENGINES $Feature_N(E)$, where N can be any integer, indicates that there exists a number (N) of feature points, or signals, that can be used in the ranking of engines. In this example formula, each of the feature functions, such as $Feature_1(E)$, $Feature_2(E)$, $Feature_N(E)$, returns a score between 0 and 1. Likewise, the NormalProbability functions normalize the probabilities provided by the server and client scores to between 0 and 1 so that a consistent calculation can be made.

The input engine selector 1336 queries the engines and returns XML responses as follows:

- Response Envelope V
- FOREACH Engine E in Selection(ENGINE_CANDIDATES, N)
  - V += E.Query(Q)
- Return V With regard to the XML response, an example engine query function (implemented in IAppEngine) returns a response that includes the ID of the engine, for example <Response ID=APPID> . . . </Response>. The candidates that are returned by this XML fit capabilities of the scenario of the host application. For example, in MESSENGER_CHATBOX, a chat window of the user interface of the MSN® Messenger application, a movie image payload may be Animated Gif, while in another chat application with less capabilities, the image may be a JPG file. The IME 1306 may have pre-packaged XML for at least some scenarios. When a request comes in, the insertion manager 1332 may use Extensible Stylesheet Language Transformations (XSLT) to convert the candidates to the needs of a particular scenario.

With regard to engine quality and relevance, machine-learning techniques may be applied. For example, on another process, a diagnostics monitor may watch the performance of the engines and if a particular engine is running slow, such engine may be penalized in terms of ranking (added as an additional feature point), or may be disabled. Additionally or alternatively, global learning from multiple users may be used. For example, the input engine selector 1336 may consider the overall popularity (or accuracy) of engines among different users and use the overall popularity as another feature in the ranking.

If one or more engines are located at the client device, the client component of the IME will direct the query to the local engines of the engine pool 1340. The architecture/flow is the same as when implemented using a remote server. The local engines may be implemented in Jscript scripting language. In addition, for security reason, the local engines may not be configured to use ActiveX. Rather, certain Object Models may be exposed to use. Example object model functions are shown in Table 5.

TABLE 5

Example Object Model Functions

| Functions | Description |
| --- | --- |
| InfoObject CheckStorage( ) | Retrieves a record object that provides information on the storage used and space left. |
| InfoObject ReadStorage(key) | Retrieves a storage record given a key if user consented according to manifest. |
| Bool WriteStorage(key, value) | Writes to storage using key value pair according to the storage a user consented to from manifest. |
| String CallWebService(url) | Queries a web service and returns a string. Note this is verified against the capabilities consented for in the manifest. |
| Void Response(xml) | Provides an XML response that will be handed to the display state. |

At the display state, upon receiving an XML response from the service (either local or remote), the candidate manager 1330 processes the response and transforms it as necessary depending on the target of the selected applications and whether the candidates are text candidates to be displayed at the text candidate window 1316 or rich candidates to be displayed at the rich candidate window 1318. The transformation happens via XSLT, and the precise XSLT is determined based on scenario and targets provided in the XML manifest.

For example, the rich candidates may be displayed in an embedded web browser. There is a special object model to communicate with the IME in order to eventually insert the rich candidate into the host application. An example function is SendInput which takes an XML string. This string will be interpreted at the insertion state. Table 6 lists example functions of CanddidateOM.JS

TABLE 6

Example functions for Displaying Candidates

| Functions | Description |
| --- | --- |
| Void SendInput(xml) | Sends XML of a candidate to insertion state. |
| String Screenshot(element) | Takes a screenshot of an element in the display and returns a specialized path that can be referenced in the XML to SendInput. |
| Void BindKey (keynumber, callbackfn) | Binds a key like "5" to a callback function to enable keyboard shortcuts in the rich candidate window. |
| Int GetKeyStart( ) | Retrieves a number representing the first key that represents the first rich candidate. |
| Int GetWindowHeight( ) | Retrieves a rich candidate window height. |
| Int GetWindowWidth( ) | Retrieves a rich candidate window width. |
| Void ResizeWindow(width, height) | Resizes the rich candidate window. |

At the insertion state, the insertion manager 1332 will receive an XML response from the candidate manager 1330 described in the display state. The insertion manager 1332 is responsible for transforming this XML into the optimal format for the application host. It works by looking up the appropriate XSLT to use according to the current scenario, in the manifest. Then it transforms the candidate and ultimately inserts the candidate into the host application. There can be multiple implementation methods for insertion. For example, the insertion manager 1332 may leverage the clipboard as a communication channel between applications. The insertion manger 1332 first temporarily copies whatever is existing in the clipboard to a temporary location, then copies the HTML for rich candidates or text for text candidates into the clipboard, sends a paste command to paste the candidate at the host application, and then restores the data at the temporary location to the clipboard. Other implementations, for example, may leverage COM automation to get a hold of the object model of the host application.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
collecting multiple parameters relating to a user input into an input method editor (IME), the multiple parameters including:
a query submitted by a user through an interface of the IME; and
a scenario of a host application that indicates a type of interaction with the host application;
selecting, based at least in part on the multiple parameters, an application from one or more applications to provide one or more candidates for the user to select from to input into the host application;
sending a request to the application to provide the one or more candidates;
receiving, from the application, the one or more candidates for the user to select from to input into the host application, the one or more candidates including a rich candidate comprising at least one of audio, video, an image of weather information, or an image of map information; and displaying the one or more candidates to the user through the interface of the IME for the user to select from to input into the host application.

2. The method as recited in claim 1, further comprising:
receiving an indication from the user that the user is interested in accessing additional information associated with a particular candidate of the one or more candidates;
selecting an application to provide an informative candidate, the informative candidate illustrating the additional information associated with the particular candidate; and
presenting the informative candidate.

3. The method as recited in claim 1,
wherein the displaying the one or more candidates to the user through the IME comprises:
displaying the rich candidate at a rich candidate window of the IME; and
in response to a determining that the one or more candidates include a text candidate, displaying the text candidate at a text candidate window of the IME.

4. The method as recited in claim 3, further comprising:
receiving a selection by the user of a respective candidate from the one or more candidates; and
inserting the respective candidate into a user interface of the host application in a format supported by the host application.

5. The method as recited in claim 1, wherein the multiple parameters further include a context of the user input, a language mode, and a previous use history.

6. The method as recited in claim 1, wherein the sending the request comprises calling an engine of the application that has at least some components residing at a server.

7. The method as recited in claim 1, further comprising:
presenting a graphical user interface (GUI) of an application store that includes one or more icons representing the one or more applications respectively;
receiving a user-submitted indication through the GUI to select a respective icon representing a respective application;
downloading at least a portion of the respective application from a server to a client device; and
installing at least a portion of the respective application at the client device.

8. The method as recited in claim 1, further comprising pre-installing at least a portion of at least one of the one or more applications at a client device.

9. The method as recited in claim 1, wherein the selecting comprises:
pre-selecting one or more qualified applications from the one or more applications that are qualified to run under the scenario of the host application;
calculating a score for each of the one or more qualified applications based on the multiple parameters relating to the user input;
ranking the one or more qualified applications based on their respective scores; and
selecting the application from the one or more qualified applications based on a threshold of score, a threshold of ranking, or both.

10. The method as recited in claim 9, further comprising modifying a ranking or a score of a particular application through machine-learning techniques.

11. The method as recited in claim 1, further comprising:
receiving an indication of a user selection of a particular application from the one or more applications, the one or more applications including at least one of a calculator application, a map application, or a weather application;
launching the particular application;
collecting another one or more parameters relating to another user input into the particular application, the another one or more parameters including another user-submitted query received through the particular application; and
requesting the particular application to provide one or more candidates at least partly based on the another one or more parameters.

12. The method as recited in claim 1, further comprising using a manifest file in a form of declarative markup language to describe one or more characteristics of the one or more applications, the manifest file being human-readable and editable.

13. The method as recited in claim 1, further comprising providing an application management interface to enable a user to add, delete, or modify one or more characteristics of a respective application, the one or more characteristics including a respective condition that a respective application is qualified to run under different scenarios of different host applications and a respective score of the respective application under different parameters.

14. The method as recited in claim 1, further comprising allowing a respective application to access and manage functionalities of the IME.

15. The method as recited in claim 1, wherein a presentation style of a respective application of the one or more applications is not tied with a presentation style of the IME, the presentation style of the respective application and the presentation style of the IME including a skin respectively.

16. The method as recited in claim 1, further comprising selecting another application from the one or more applications to provide another one or more candidates for the user to select from to input into the host application at least partly based on the multiple parameters, the application and the another application running concurrently and independently.

17. A method comprising:
providing an input method editor (IME) user interface indicating one or more applications associated with the IME;
receiving a user-submitted selection of a particular application from the one or more applications;
launching the particular application in a stand-alone interface independent from the IME user interface;
collecting multiple parameters relating to a user input into the particular application, the multiple parameters including:
a query submitted by a user through the stand-alone interface of the particular application; and
a scenario of the particular application that indicates a type of interaction with the particular application;
sending a request to the particular application to provide one or more input candidates to be input into a user interface of a host application based at least partly on the multiple parameters; and
receiving, from the particular application, the one or more input candidates to be input into the user interface of the host application, the one or more input candidates including at least one of audio, video, an image of weather information, or an image of map information.

18. The method as recited in claim 17, further comprising using a manifest file in a form of declarative markup language to describe one or more characteristics of the one or more applications associated with the IME, the manifest file being human-readable and editable.

19. A system comprising:
one or more processors; and
computer storage media having stored thereon computer executable components that are executable by the processor to perform actions comprising:
providing a user interface of an application store that presents one or more user-selectable icons representing one or more applications, each icon representing an application of the one or more applications that, when associated with an input method editor (IME), provides extended functionality to the IME;
representing the one or more applications represented by the one or more icons in a manifest file, the manifest file describing one or more characteristics of the associated applications, the manifest file being human-readable;
collecting multiple parameters relating to a user input into a host application, the multiple parameters including:
a query that is input by the user through an interface of the host application;
a context of the user input; and
a scenario of the host application that indicates a type of interaction with the host application;
selecting an application from the one or more applications based on the collected multiple parameters and the one or more characteristics of the one or more applications in the manifest file; and
receiving, from the one or more applications, one or more candidates for the user to select from to input into the host application, the one or more candidates including at least one of audio, video, and image of weather information, or an image of map information.

20. The system as recited in claim 19, the actions further comprising providing an application configuration user interface to enable a user to manage characteristics of a respective application, the managing including adding, deleting, or modifying one or more characteristics of the respective application including the running condition element.

* * * * *